United States Patent
Tanaka et al.

(10) Patent No.: US 9,952,544 B2
(45) Date of Patent: Apr. 24, 2018

(54) IMAGE FORMING APPARATUS AND CONTROL DEVICE THEREFOR

(71) Applicant: CANON KABUSHIKI KAISHA, Tokyo (JP)

(72) Inventors: Masanobu Tanaka, Kashiwa (JP); Yasuharu Chiyoda, Nagareyama (JP); Oki Kitagawa, Nagareyama (JP); Asuna Fukamachi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/367,632

(22) Filed: Dec. 2, 2016

(65) Prior Publication Data

US 2017/0160686 A1 Jun. 8, 2017

(30) Foreign Application Priority Data

Dec. 3, 2015 (JP) ................................ 2015-236803

(51) Int. Cl.
*G03G 15/00* (2006.01)
*H04N 1/00* (2006.01)

(52) U.S. Cl.
CPC ..... *G03G 15/5016* (2013.01); *G03G 15/5058* (2013.01); *H04N 1/00037* (2013.01); *H04N 1/00058* (2013.01); *H04N 1/00082* (2013.01); *H04N 1/00915* (2013.01); *G03G 2215/0129* (2013.01); *H04N 2201/0091* (2013.01)

(58) Field of Classification Search
CPC ........... G03G 15/5016; G03G 15/5058; G03G 2215/0129; G03G 15/50–15/505; H04N 1/00037; H04N 1/00058; H04N 1/00082; H04N 1/00915; H04N 2201/0091
See application file for complete search history.

(56) References Cited

U.S. PATENT DOCUMENTS 9,128,707 B2 9/2015 Baba et al.
9,317,789 B2 * 4/2016 Wilsher ............. G03G 15/5004
2007/0053710 A1 * 3/2007 Shibaki ................. G03G 15/50
399/81

(Continued)

FOREIGN PATENT DOCUMENTS

JP 05127447 A * 5/1993
JP 06-19261 A 1/1994

(Continued)

*Primary Examiner* — Clayton E Laballe
*Assistant Examiner* — Ruifeng Pu
(74) *Attorney, Agent, or Firm* — Fitzpatrick, Cella, Harper & Scinto

(57) ABSTRACT

An image forming apparatus includes an image forming portion for forming an image, a human presence sensor for detecting presence of a human body adjacent the apparatus, and a controller capable of executing an adjustment process operation for the image forming portion when a first predetermined number of prints are produced. When the human presence sensor detects a human body in the neighborhood of the apparatus, the execution of the adjustment process operation is deferred to reduce the waiting time necessitated by the adjustment operation, but if a second predetermined number of prints are produced, the image forming operation of the image forming portion is interrupted, and the deferred adjustment process is executed.

15 Claims, 14 Drawing Sheets

(56) References Cited

U.S. PATENT DOCUMENTS

| | | | |
|---|---|---|---|
| 2007/0091390 A1* | 4/2007 | Kimura | G03G 15/50 358/500 |
| 2009/0129802 A1* | 5/2009 | Yasukawa | G03G 15/5012 399/53 |
| 2016/0261760 A1* | 9/2016 | Aso | H04N 1/00307 |
| 2017/0142278 A1* | 5/2017 | Tanaka | G03G 15/50 |

FOREIGN PATENT DOCUMENTS

| | | |
|---|---|---|
| JP | 2006-208668 A | 8/2006 |
| JP | 2013-029839 A | 2/2013 |

\* cited by examiner

IMAGE FORMING APPARATUS AND CONTROL DEVICE THEREFOR

FIELD OF THE INVENTION AND RELATED ART

The present invention relates to an image forming apparatus provided with a human presence sensing function.

Japanese Laid-open Patent Application 2013-029839 (U.S. Pat. No. 9,128,707) proposes an image forming apparatus which detects approaching of a human to the image forming apparatus by a human presence sensor and then automatically restoring the apparatus from an electric power saving mode to a normal mode.

Japanese Laid-open Patent Application Hei 6-19261 discloses a copying machine provided with a sensor for sensing an operator in the neighborhood of the copying machine, and when the operator is in the neighborhood of the copying machine, no adjustment step is executed, so that the waiting time required by the execution of the adjustment step is reduced.

With the conventional image forming apparatus, however, the adjustment step is never carried out as long as the operator is in the neighborhood of the copying machine. Therefore, in the case that the operator is in the neighborhood of the copying machine for the long term, printing operations and/or copying operations are carried out without execution of the adjustment step for the long term, and therefore, the image quality may deteriorate.

SUMMARY OF THE INVENTION

Accordingly, it is an object of the present invention to provide an image forming apparatus with which the deterioration of the image quality is suppressed, while suppressing increase of the waiting time of the operator.

According to an aspect of the present invention, there is provided an image forming apparatus comprising an image forming portion configured to form an image on a recording material; a human presence sensor configured to detect presence of a human body in a predetermined area; and a controller configured to control as to whether to execute an adjustment process operation for said image forming portion, depending on whether or not said human presence sensor detects the human body. When a number of recording materials on which the images are formed by said image forming portion during execution of image forming process operation is a first predetermined number, and said human presence sensor does not detect the human body, said controller interrupts the image forming process operation and executes the adjustment process. When the number of recording materials on which the images are formed by said image forming portion during the execution of the image forming process operation is the first predetermined number, and said human presence sensor detects the human body, said controller defers the execution of the adjustment process operation and continues the image forming process operation, and said controller interrupts the continued image forming process operation and executes the adjustment process operation when a number of recording materials on which the images are formed by said image forming portion during the continued image forming process operation reaches a second predetermined number.

According to another aspect of the present invention, there is provided a control device for controlling an image forming apparatus, said image forming apparatus including an image forming portion configured to form an image on a recording material, and a human presence sensor configured to detect presence of a human body in a predetermined area, said control device comprising a controller configured to control as to whether to execute an adjustment process for the image forming portion, depending on whether or not the human presence sensor detects the human body. When a number of recording materials on which the images are formed by the image forming portion during execution of image forming process operation is a first predetermined number, and the human presence sensor does not detect the human body, said controller interrupts the image forming process operation and executes the adjustment process. When the number of recording materials on which the images are formed by the image forming portion during the execution of the image forming process operation is the first predetermined number, and the human presence sensor detects the human body, said controller defers the execution of the adjustment process operation and continues the image forming process operation, and said controller interrupts the continued image forming process operation and executes the adjustment process operation when a number of recording materials on which the images are formed by the image forming portion during the continued image forming process operation reaches a second predetermined number.

Further features of the present invention will become apparent from the following description of exemplary embodiments with reference to the attached drawings.

DESCRIPTION OF THE EMBODIMENTS

Preferred embodiments of the present invention will be described in conjunction with the accompanying drawings. The constituent-elements of the embodiments are examples, and the present invention is not limited to such specific examples.

Embodiment 1

(1) General Arrangement of Image Forming Apparatus

<General Arrangement of Image Forming Apparatus>

Figure 1:
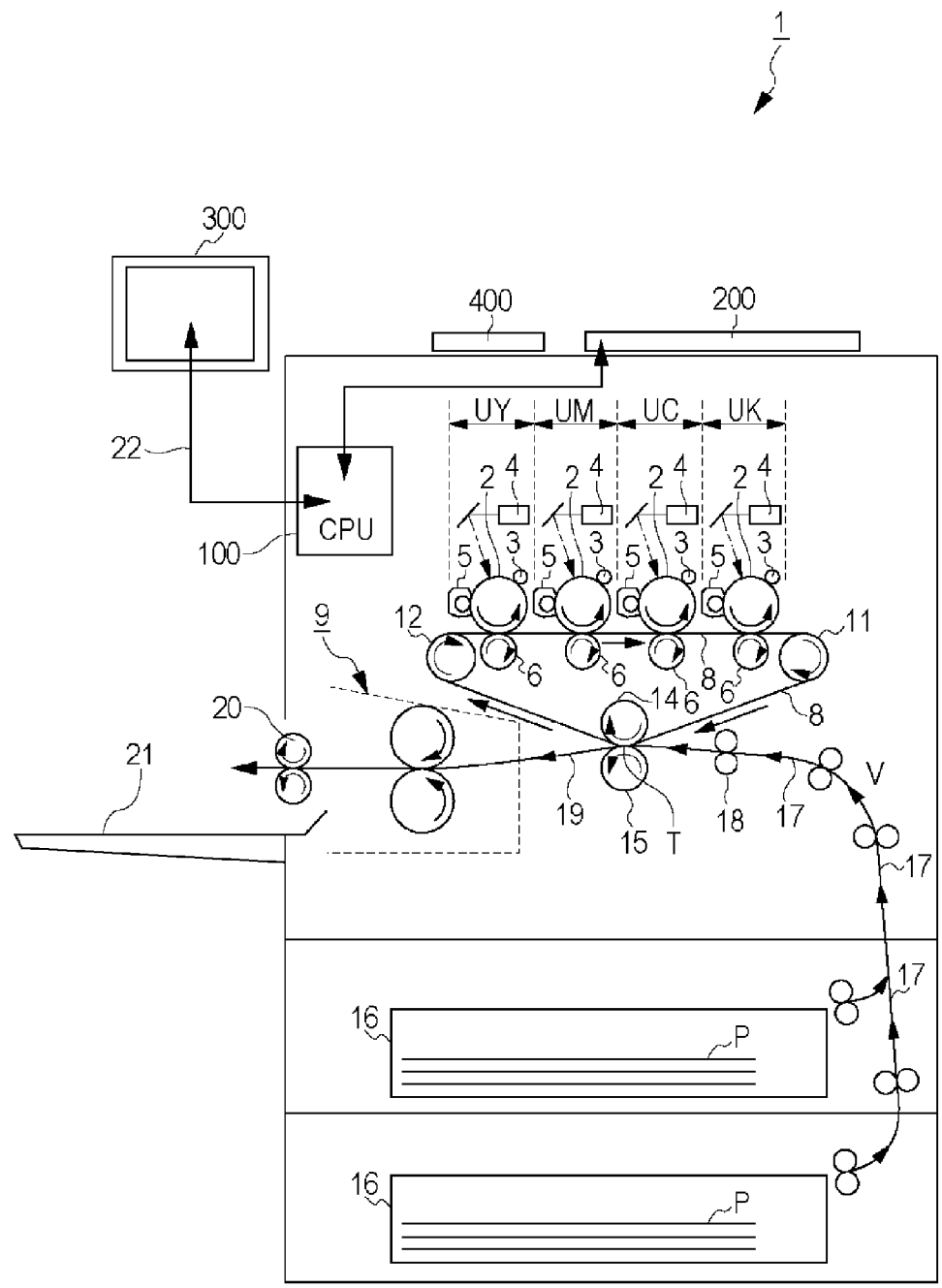
FIG. 1 is a sectional view of an image forming apparatus.

FIG. 1 is a sectional view of an image forming apparatus. The image forming apparatus 1 (apparatus 1) is an example of the image forming apparatus according to an embodiment of the present invention. The apparatus 1 is an electrophotographic laser beam printer.

In the apparatus 1, a CPU (controller) 100 receives a printing job (image formation instruction) from an operating portion 200, and executes an image forming process for forming an image on a sheet (recording material) P using an image forming station. In the image forming process operation, the image information (original image or original data) indicative of the information to be formed on the sheet P is acquired from a host apparatus 300. The operating portion 200 comprises a display panel and operation keys, and the operator produces image formation instruction to the apparatus 1 by depressing the operation keys. Thus, the operating portion 200 functions as a receiving portion for receiving the printing job (image formation instruction). The display panel of the operating portion 200 may be a touch panel type, in which case the display panel functions also as the operation keys.

In addition, the apparatus 1 may include a scanner portion (unshown), so that the image information (original image or original data) to be formed on the sheet P by the image forming process is acquired from the scanner portion. The scanner portion functions as a reading portion for reading the original (the image formed on the recording material). The operating portion 200 receives the printing instructions for the image read by the scanner portion, from the operator, in response to the reception of the image formation instruction by the operating portion 200, the apparatus 1 forms a toner image of the image information of the original read by the scanner portion, on the sheet (recording material) P and outputs the sheet P.

The apparatus 1 is connectable with the CPU (controller) 100 through the host apparatus 300 and the network. The apparatus 1 is capable of forming the toner image corresponding to the electrical image information (original data) supplied from the host apparatus 300 communicably connected with the network on the sheet P.

The printing job (image formation instruction) may be received from the host apparatus 300. Also in this case, "the printing job (image formation instruction) is received" in the following description corresponds to "the printing job (image formation instruction) is received by the operating portion 200" unless otherwise stated particularly.

The CPU 100 supplies and receives electrical signals to and from the host apparatus 300, the operating portion (console portion) 200, a human presence sensor 400, the scanner portion and various image forming portions to control the execution of the image forming process for forming the image on the sheet P. The host apparatus 300 is a personal computer, a facsimile machine or the like, for example. The sheet P is the material on which the toner image is formed by the apparatus 1, and is a sheet of paper, an OHP sheet, a postcard, an envelope or the like, for example.

In the apparatus 1, a sheet feeding mechanism 16, a feeding path 17, an inclined feeding mechanism 18, secondary transfer rollers 14, 15, a feeding path 19, a fixing device (fixing portion) 9, a discharging roller pair 20 and a sheet discharge tray 21 are arranged in the order named from the upstream side to the downstream side of the feeding of the sheet. The image forming portion is the structure for forming the image on the sheet P (recording material) and includes units UY, UM, UC and UK, an intermediary transfer belt 8, secondary transfer rollers 14 and 15 and the feeding portion (sheet feeding mechanism 16, the feeding path 17, the inclined feeding mechanism 18) for feeding the sheet P.

Each of the units UY, UM, UC and UK comprises a drum type electrophotographic photosensitive member (drum) 2 as an image bearing member, a formation portion for forming an image (unfixed toner image) on the drum 2. The units UY, UM, UC and UK form the toner images of respective yellow, magenta, cyan and black colors on the drums 2, respectively. The order of the arrangement of the units UY, UM, UC and UK is an example, and is not restrictive to the present invention. The drum 2 is rotated by a driving portion (unshown) in a direction indicated by an arrow (counterclockwise) in FIG. 1 at a predetermined peripheral speed (process speed). Around each of the units UY, UM, UC and UK, there are provided a charger 3, an exposure device 4, a developing device 5, a primary transfer roller 6 and a cleaning device (unshown) as process means actable on the drum 2 in the order named along the peripheral moving direction of the drum. The charger 3, the exposure device 4 and the developing device 5 function as a forming portion for forming the toner image (image) on the drum 2 (photosensitive member). The process means of the units UY, UM, UC and UK have the same structures, and therefore, common reference numerals are assigned.

The charger 3 is the charging means (charge portion) for uniformly charging the surface of the rotating drum 22 to a predetermined potential of a predetermined polarity, and the surface of the drum 2 is charged to the predetermined potential of the predetermined polarity.

The exposure device 4 is the exposure means (exposing portion) for exposing the drum 2 so as to form a latent image corresponding to the image information on the charged surface of the drum 2. In this example, it is a laser scanner for forming an image corresponding to the image signal supplied from the CPU 100. The laser scanner deflects by rotation of a polygonal mirror the laser beam emitted from the laser beam source and modulated in accordance with the image signal and is projected on the drum 2 through a fθ lens to scan the surface of the drum 2 in the direction of the generatrix of the drum 2. By this, an electrostatic latent image of an image pattern corresponding to the image signal is formed on the surface of the drum 2.

The developing device 5 is the developing means (developing portion) for visualizing (developing) the electrostatic latent image on the surface of the drum 2 with toner (developer) into an unfixed toner image.

The primary transfer roller 6 is the primary transferring means (transfer portion) for transferring the toner image from the drum 2 onto the intermediary transfer belt 8 as an intermediary transfer member. The primary transfer roller 6 is pressed on the drum 2 with a predetermined urging force. The primary transfer rollers 6 of the units UY, UM, UC and UK transfer the yellow, magenta, cyan, and black toner images from the drums 2 sequentially onto the intermediary transfer belt 8.

The cleaning device is cleaning means for removing residual material such as untransferred toner remaining on the drum 2 after the image transfer onto the intermediary transfer belt 8, thus cleaning the surface of the drum 2.

Sheet feeding mechanism 16 is the sheet feeding means (supply portion) for feeding the sheet P from the cassette accommodation of the sheet feeding mechanism 16 toward a transfer nip T provided by the secondary transfer rollers 14 and 15. For example, the sheet feeding mechanism 16 of this example includes first and second cassettes arranged substantially vertically. The cassettes accommodate different size sheets P so as to regulate them in parallel with the sheet feeding direction by size regulating plates (side guiding plates). The secondary transfer rollers 14 and 15 transfer the toner images from the intermediary transfer belt 8 onto the sheet P supplied by the sheet feeding mechanism 16, in the transfer nip T.

The toner remaining on the intermediary transfer belt 8 without being transferred onto the sheet is removed by a cleaning device (unshown) for the intermediary transfer member. The cleaning device for the intermediary transfer member is provided between the transfer nip T and the primary transfer roller 6 of the upstreammost unit UY with respect to the peripheral moving direction of the intermediary transfer belt 8.

When the CPU 100 receives the printing job from the operating portion 200, the CPU 100 drives the feeding roller of the sheet feeding mechanism 16 accommodating the sheet of the designated size. By this, the apparatus 1 singles the sheet P out of the cassette of the sheet feeding mechanism 16 and feeds the sheet P to an oblique feeding correcting mechanism 18 by way of the feeding path 17 including the feeding rollers. The oblique feeding correcting mechanism 18 functions to correct the oblique feeding of the sheet P.

The sheet P departing the oblique feeding correcting mechanism 18 is introduced to the transfer nip T to receive the unfixed toner image from the intermediary transfer belt 8.

The sheet P departing the transfer nip T is separated (peeled off) from the surface of the intermediary transfer belt 8 and is introduced to the fixing device 9 by the way of the feeding path 19. In the fixing device 9, the toner image formed on the sheet P by the image forming portion is fixed on the sheet P by heat and pressure into a fixed image. The sheet P having the fixed image is discharged onto the sheet discharge tray 21 (outside) by the pair of discharging rollers (discharging portion) 20.

<Control Block Diagram>

Figure 8:
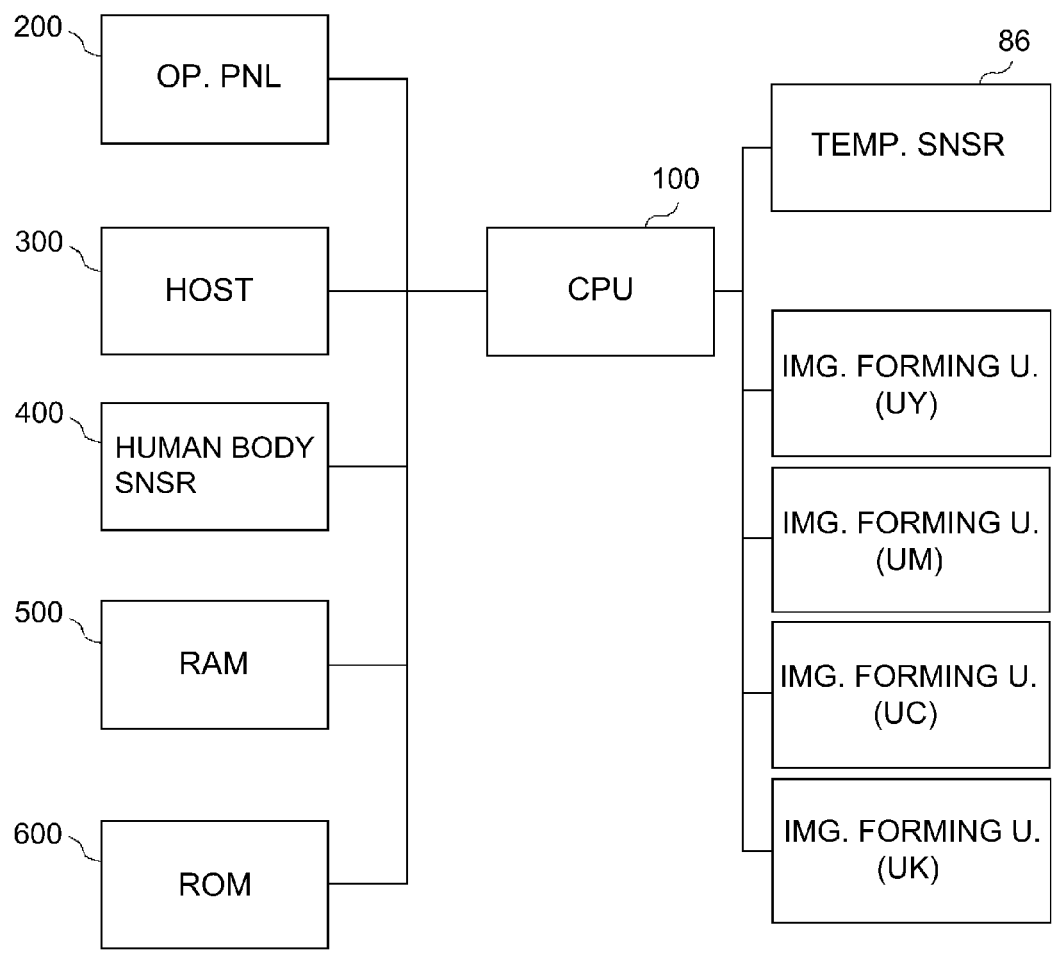
FIG. 8 is a control block diagram.

FIG. 8 is a control block diagram and shows an example of a hardware structure including the CPU 100 as a main element. The CPU 100 is electrically connected with the operating portion 200, the host apparatus 300, the human presence sensor, a RAM 500, a ROM 600, a density sensor 86 and the image forming portion (units UY, UM, UC and UK, for example). The CPU (controller) 100 as an executing portion controls the elements electrically connected therewith in accordance with a program stored in the RAM 500. The program may be stored in the ROM 600.

(2) Human Presence Sensor

The human presence sensor 400 will be described. The human presence sensor 400 functions as a human presence sensor for detecting the presence of a human in the predetermined area adjacent to the apparatus 1. The human presence sensor 400 of this embodiment is a pyroelectric array sensor including an array of passive pyroelectric infrared radiation sensors. The passive pyroelectric infrared radiation sensor detects a change of an amount of infrared radiation emitted from an object having a temperature, such as human body or the like. When the human body appears in the sensing area, the infrared radiation amount changes, by which the human presence sensor 400 can detect the presence of the human body (human) in the neighborhood of the apparatus 1. The passive pyroelectric infrared radiation sensor is advantageous in that the electric energy consumption is small and in that the sensing area is relatively wide. In addition, by arranging a plurality of the passive pyroelectric infrared radiation sensors in an array, a distance to the human body from the apparatus 1 using a distribution of the infrared radiation amount in the sensing area can be detected, and a moving direction and/or a moving speed of the human body can be detected using a change of the distribution with time.

Figure 2:
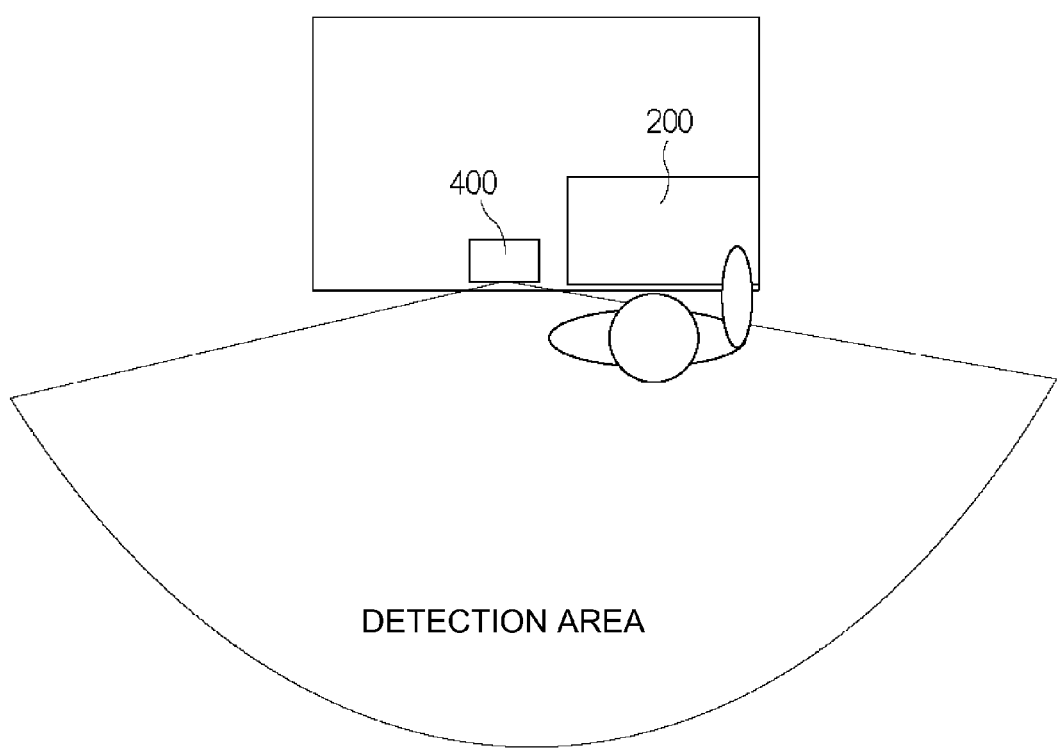
FIG. 2 illustrates a sensing area of a human presence sensor.

FIG. 2 shows the sensing area of the human presence sensor, that is, the range from which the human presence sensor 400 of this example can detect the infrared radiation. FIG. 2 schematically shows a top plan view of the installed apparatus 1. The area adjacent to the apparatus 1 is a predetermined area including the positions at which the operator operating the operating portion 200 in front of the apparatus 1 is present, as shown in FIG. 2.

The detecting type of the human presence sensor 400 is not limited to the above-described specific type. For example, the type in which infrared radiation light receiving elements for receiving the infrared radiations emitted from the human body are arranged in the form of a matrix is usable. Furthermore, it may be an image recognition type in which the movement of the human body is detected using a change of the image obtained by continuous phototaking with a CCD camera or the like. In addition, it may be a reflection type in which an image of the human body is detected from a change of the quantity of the light (infrared radiation, for example) emitted from a light source and reflected from the human body. In this embodiment, the human presence sensor 400 is disposed adjacent to the operating portion 200, but it may be disposed in another position if the appearing and disappearing of the human body can be detected and transmitted to the CPU 100.

The human presence sensor 400 of this embodiment functions also as a means for producing a trigger for restoration from a sleeping mode. The sleeping mode is executed by the CPU 100 as the executing portion, and in the sleeping mode, the electric power supply to the operating portion 200 is shut off, by which the electric power consumption of the operating portion 200 is saved. For example, in the case that the operation on the operating portion 200 is not carried out for a predetermined period of time, the sleeping mode is executed. In the sleeping mode, the human presence sensor 400 and the CPU 100 as the executing portion are in operation. When, in the sleeping mode, the presence of the human body adjacent to the apparatus 1 is detected by the human presence sensor 400, the CPU 100 executes the starting operation for the operating portion 200. When the operating portion 200 is started, the operating portion 200 becomes capable of receiving the instruction of the user. By this, the starting operation for the operating portion 200 can begin before the user actually touches the apparatus 1, and therefore, the usability can be improved. A plurality of such human presence sensors 400 may be provided.

(3) Deferment (Delaying) of Adjustment Process

The apparatus 1 is provided with the human presence sensor 400, and when a predetermined condition is satisfied and the human body is not sensed in the predetermined area in the neighborhood of the apparatus 1, adjustment process is carried out interrupting the printing operation (image forming process operation). On the other hand, even when the predetermined condition is satisfied, the apparatus 1 defers the adjustment process and continues the printing operation. In the case that the printing operation is continued with deferring the operation of the adjustment process, the apparatus 1 interrupts the printing operation and carries out the adjustment process if a second condition is satisfied. The more detailed description will be made in the following.

In this example, the predetermined condition is that the number of prints (the number of sheets P) on which the images are formed from the previous adjustment process operation becomes not less than a predetermined number of sheets (not less than 1000 sheets, for example). The second condition in this example is that the number of sheets P on which the images are formed after the deferment of the adjustment process response to the satisfaction of the predetermined condition reaches a predetermined number (500 sheets, for example). The details of the adjustment process will be described hereinafter.

In this embodiment, the deferment of the adjustment process operation is to solve the following problem. A stability of the image quality provided by the image forming apparatus can be maintained by executing the adjustment process operations at a relatively high frequency with interruption of the image forming process operation. On the other hand, the adjustment process interrupting the image forming process results in the corresponding reduction of the productivity of the image forming apparatus. Assuming that the image forming process operation is interrupted, and the adjustment process operation is carried out whenever the predetermined condition (not less than 1000 sheets) is satisfied, the following problem arises.

When the user wants to obtain the prints urgently, the user may often wait for the completion of the printing in the neighborhood of the image forming apparatus, so that the user can get the prints immediately after the completion of the printing. Suppose, for example, when the user requiring urgent 100 prints waits for the completion of the prints in the neighborhood of the image forming apparatus, the predetermined condition is reached when 90 prints are produced. In the case that the adjustment process operation is carried out within the option of the running image forming process operation whenever the predetermined condition is satisfied, the image forming apparatus interrupts the image forming operation immediately after 90 prints are produced and then carries out the adjustment process operation. The printing operation is resumed after the completion of the adjustment process operation. As a result, the waiting time of the user increases due to the adjustment process, with the result of the deteriorated usability from the standpoint of the user.

With the image forming apparatus capable of executing the adjustment process interrupting the image forming process operation at the frequency determined to put weight on the stability of the image quality, a very significant influence does not immediately appear on the performance of the apparatus or on the printed products even if the operation of the adjustment process is deferred. Under the circumstances, the apparatus of this embodiment has two thresholds of the print number as the interrupting condition in the image forming process operation. One of them is the print number (1000 sheets, for example), which is determined to put weight on the stability of the image quality, and the other is determined to put weight on the productivity (1500 sheets, for example). Even when the first threshold is reached during the execution of the image forming operation (that is, the first predetermined condition is met), the execution of the adjustment process is deferred to continue the image forming operation from the standpoint of the productivity, if a person is in the neighborhood of the apparatus 1. In such a deferred case, the deferred adjustment process operation is carried out when the second threshold is met. The difference between the first and second thresholds corresponds to the predetermined number of sheets of the second condition. Thus, when the execution of the adjustment process is deferred and the image forming operation is continued, the deferred adjustment process is executed when the second condition is satisfied.

(4) Deferment (Delay) of Density Adjustment Control

In this example, the adjustment process to be deferred is a density adjustment control. The density adjustment control is to determine an image forming condition of the image forming portion.

<Summary of Density Adjustment Control>

Figure 3:
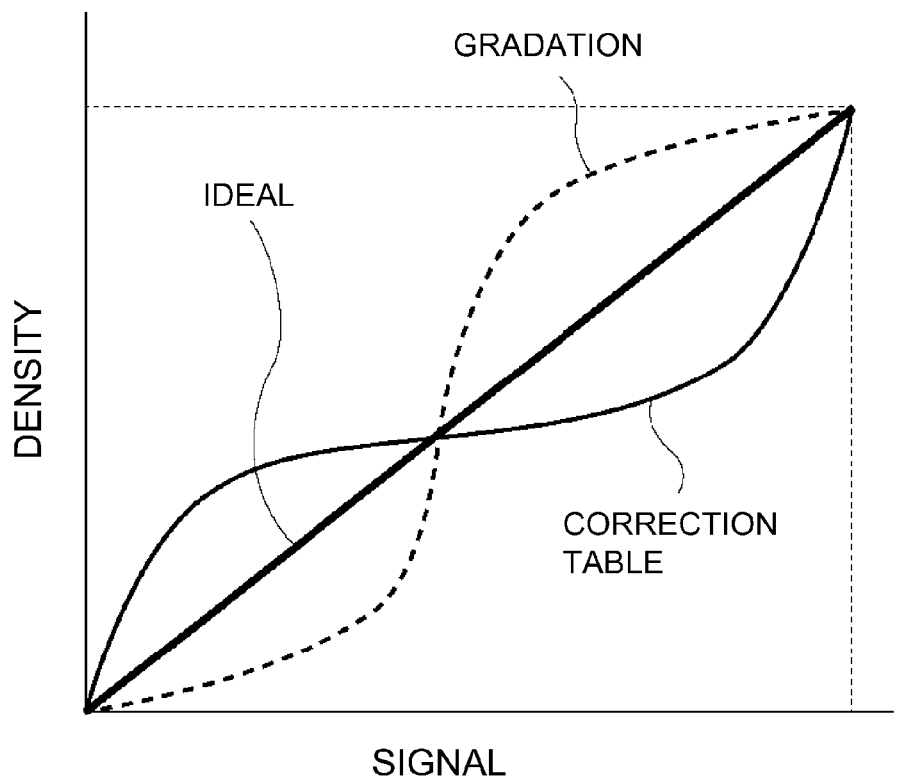
FIG. 3 is a schematic view of tone gradation correction.

The apparatus 1 carries out a tone gradation correction control to effect the image formation with an appropriate density relative to the inputted original. FIG. 3 is a schematic illustration of a tone gradation correction and shows a correspondence between signal values and density values. A tone gradation property of the image formed by the apparatus 1 is indicated by a curved broken line (FIG. 3), while the ideal tone gradation property is as indicated by a solid rectilinear line in FIG. 3. A line of a tone gradation correction table (curved solid line in FIG. 3) corrects the broken line property (FIG. 3) to the ideal tone gradation property (solid rectilinear line, FIG. 3). The tone gradation correction table is stored in the RAM 500 (FIG. 8). The image information inputted to the apparatus 1 is converted by the CPU (converting portion) 100 on the basis of the tone gradation correction table. The image forming portion (units UY, UM, UC and UK, for example) carries out the image formation on the basis of an output the output data) having been converted on the basis of the tone gradation correction table.

In the density adjustment control, the CPU 100 determines the tone gradation correction table to be used in the image formation on the basis of patch images formed by the units UY, UM, UC and UK with different densities.

More specifically, the units UY, UM, UC and UK form the patch images having different densities, and the CPU 100 detects the densities of the patch images on the basis of the outputs of the density sensor 86 functioning as a density detecting portion. The image data for forming the patch image is stored in the RAM 500 beforehand. The patch images may be detected on the drums 2 of the units UY, UM, UC and UK, on the intermediary transfer belt 8 or on the sheet P. The CPU 100 as the determining portion determines the tone gradation correction table to be used for the image formation, on the basis of the detected densities.

The tone gradation correction table may be prepared by the CPU 100 on the basis of the different patch images, or an already prepared tentative tone gradation correction table may be corrected to provide the tone gradation correction table to be used for the image formation. In the latter case, the CPU 100 as the determining portion functions also as the correction portion. The tentative tone gradation correction table is stored in the RAM 500. The determined tone gradation correction table is stored in the RAM 500. In the printing operation (image forming process), the CPU 100 controls the units UY, UM, UC and UK on the basis of the output into which the image signal is converted on the basis of the tone gradation correction table. For example, the exposure time duration by the exposure device 4 of each unit is controlled.

<Density Adjustment Control in this Embodiment>

Figure 4:
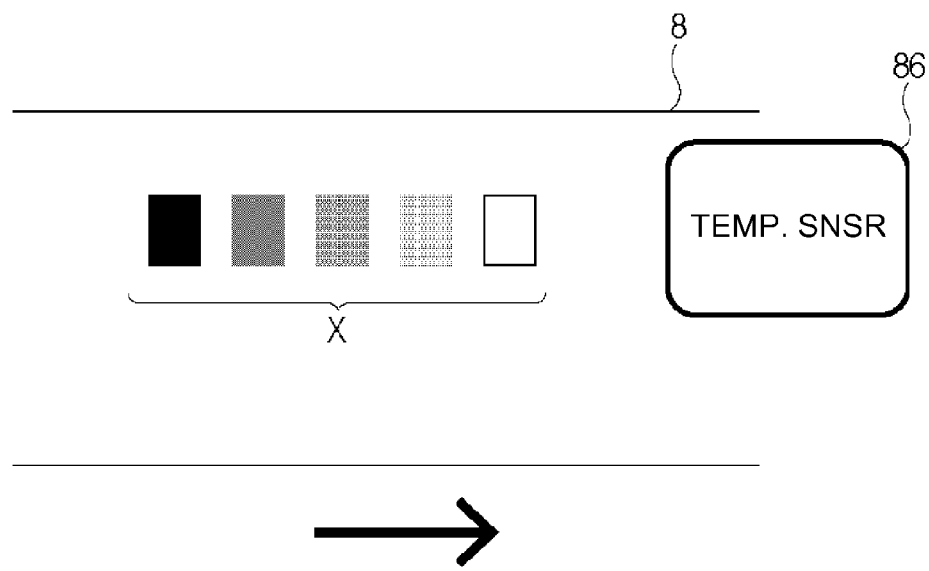
FIG. 4 is a schematic view illustrating a patch image.

In this embodiment, the CPU 100 controls the units UY, UM, UC and UK to form different density images on each of the drums 2, and the images are transferred onto the intermediary transfer belt 8. The densities of the patch images are detected by the density sensor 86 provided at a position opposing an outer peripheral surface of the intermediary transfer belt 8. On the basis of the detected densities, the CPU 100 determines the tone gradation correction table to be used for the image formation. FIG. 4 is a schematic view illustrating a patch image. FIG. 4 shows the pattern image (X, in the Figure) having different densities of a single color toner (magenta, for example) formed on the intermediary transfer belt 8.

<Execution Timing of Density Adjustment Control>

In order to provide satisfactory effects of the density adjustment control, there is provided an integration counter for counting the number of the printed sheets P after the previous execution of the density adjustment control, and the density adjustment control is executed on the basis of the count indicated by the counter. The accounting operation is carried out by the CPU 100 on the RAM 500. The print number is used as a reference for the execution of the density adjustment control, because the likelihood of the change of the density of the print increases due to the change of the charge amount of the toner with the operation of the image forming process.

In this embodiment, the density adjustment control is carried out when the value of the counter becomes not less than 1000 (predetermined condition). When the value of the counter reaches 1000 as a result of execution of the image forming process, the apparatus 1 interrupts image forming process operation and executes the density adjustment control. The density change on the print at the time when the value of the counter reaches 1000 is so small that it is difficult for the user to recognize the change, although it is desirably corrected by the density adjustment control from the standpoint of the high image quality. After the execution of the density adjustment control, the CPU 100 resets the counter. Thereafter, the CPU 100 counts the printed sheets P until the density adjustment control is executed again. However, when the predetermined condition is satisfied as described above, the density adjustment control is deferred if a person is in the neighborhood of the apparatus 1. The value of the count corresponding to the predetermined condition is merely an example, and the present invention is not limited to this example.

In addition, even when the density adjustment control is deferred, and the image forming process operation is continued, the apparatus 1 interrupts the image forming process operation and executes the density adjustment control, irrespective of whether or not a person is in the neighborhood of the apparatus 1, if the value of the counter reaches 1500 (second condition). The second condition of 1500 is determined from the standpoint of the image quality. If the value of the counter exceeds 1500, the accuracy of the tone gradation correction degrades to such an extent that the density change on the print is remarkable by the user, depending on the case. Therefore, the CPU 100 executes the adjusting operation to suppress the reduction of the image quality, although the productivity is important. Therefore, the number of the sheets (1500 in this embodiment) at which the image forming process operation is interrupted to execute the adjustment process irrespective of the presence or absence of the person is larger than the number of the sheets (1000 in this embodiment) at which the adjustment process is executed if no person is present. After the execution of the density adjustment control, the CPU 100 resets the counter. The CPU 100 counts the prints until the density adjustment control is executed again.

The values (1000 and/or 1500 sheets) in this embodiment are merely an example, and the present invention is not limited to these values.

<Control with Execution of Image Forming Process>

Figure 5:
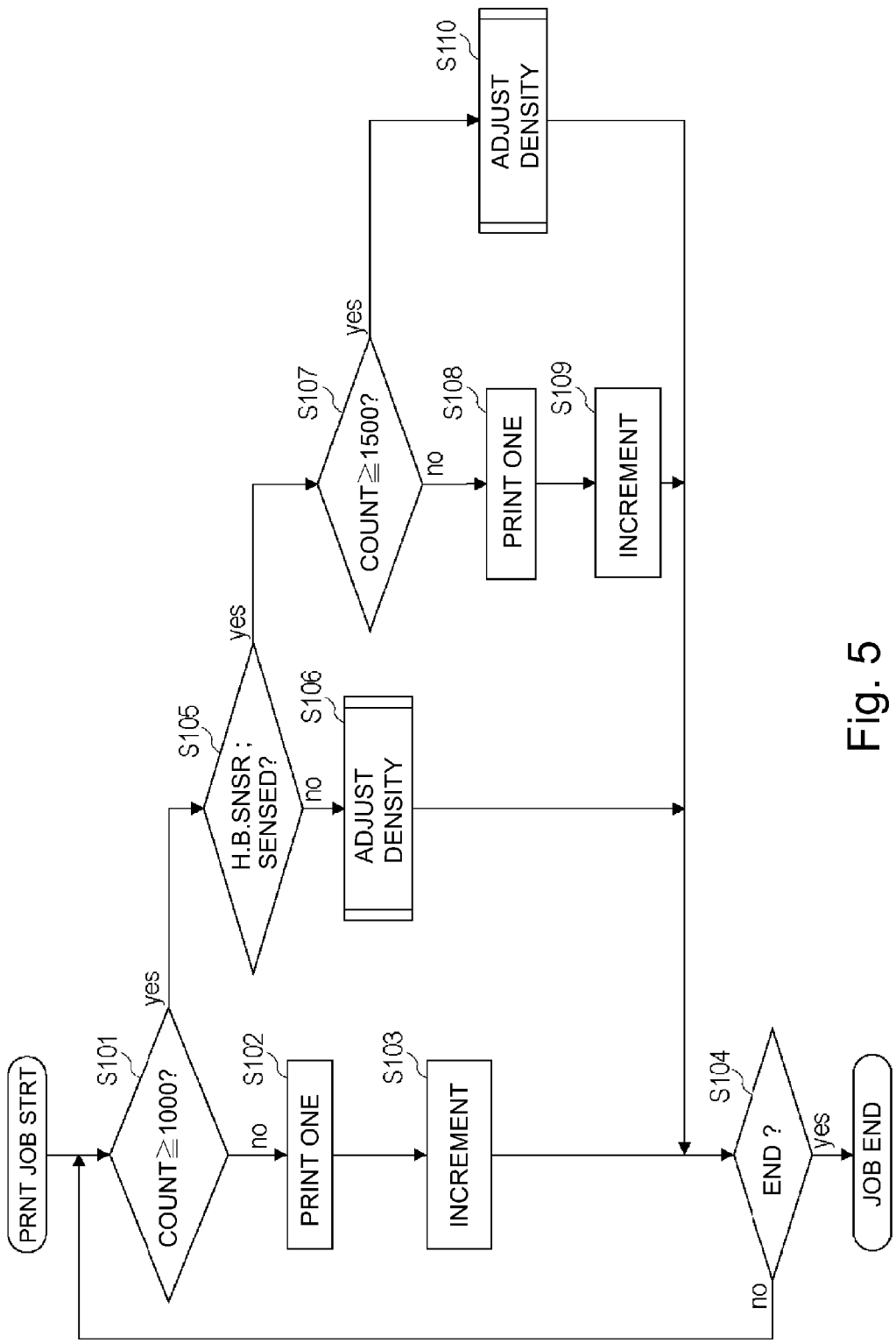
FIG. 5 is a flow chart showing a sequence of an image forming process operation.

FIG. 5 is a flow chart showing a sequence of an image forming process operation.

The control shown in flow chart is carried out by executing the program stored in the RAM 500 by the CPU (controller) 100 as the executing portion. This holds true for the controls of the other flow charts according to the other embodiments as well as this embodiment, not limiting to FIG. 5.

When the operating portion 200 receives a printing job (image formation instruction), the CPU 100 starts execution of the printing job (image forming process). When the printing job starts, the CPU 100 discriminates whether or not the value of the counter reaches 1000 (that is, whether the predetermined condition is satisfied or not) (S101).

If the value is less than 1000, the CPU 100 executes the printing operation on the sheet P (S102), and increments the counter by one (S103).

The increment is not limited to one, but may be weighted depending on the size of the sheet P. For example, when the printed sheet has a large size, the increment may be two, and when the printed sheet has a small size, the increment may be one.

In this embodiment, the execution of the printing and the sheet P is deemed by introduction of the sheet P into the transfer nip T, in response to which the counter is incremented, but the timing of incrementing the counter is not limited to such timing. More particularly, the timing may be any if it is between the instance at which the exposure device 4 of the upstreammost forming portion (unit UY, in this example) projects the beam for the trailing edge of the image to be formed on the sheet P and the instance at which the sheet P is discharged out of the apparatus 1 (onto the sheet discharge tray 21, in this example). A predetermined instance between them is preset as the incrementation timing of the integration counter. The upstreammost image forming portion is the upstreammost unit among the units UY, UM, UC and UK in the arrangement in which the transfer nip T is the downstreammost in the traveling direction of the intermediary transfer belt 8.

Then, the CPU 100 discriminates whether or not the printing job is completed (S104). If the result of the discrimination indicates that the printing job has not yet been completed, the operation returns to the step S101.

In S101, if the value of the counter is not less than 1000, the CPU 100 discriminates whether or not the human presence sensor 400 senses a human body in the predetermined area in the neighborhood of the apparatus 1 (S105). In this example, the CPU 100 acquires the output (detection result) of the human presence sensor 400 in response to the counting action resulting in exceeding 1000 (incrementing by one to 999, for example). In addition, in this example, the CPU 100 acquires the output (detection result) of the human presence sensor 400 also in response to the increment to a value exceeding 1000 (incrementing by one to 1000).

In step S105, the detection result of the human presence sensor 400 read by the CPU 100 is the output of the human presence sensor 400 when the value of the counter satisfies the predetermined condition. In this example, the discrimination at step S105 is made on the basis of the output of the human presence sensor 400 at the time when the discrimination of step S101 is carried out. However, the detection result of the human presence sensor 400 read by the CPU 100 in step S105 is not limited to such an example. For example, in the case that the printing operation is continuously carried out, the detection result of the human presence sensor 400 at predetermined timing satisfying the following may be used for the discrimination. It is between the instance at which the exposure device 4 of the upstreammost forming portion (unit UY, in this example) projects the beam for the trailing edge of the image to be formed on the 1000th or higher sheet P and the instance at which such a sheet P is discharged out of the apparatus 1 (onto the sheet discharge tray 21, in this example). In this example, the discrimination reference is the detection result of the human presence sensor 400 at the time of the discrimination in the step S101 at least, but the timing of the discrimination reference is not limited to an instance. For example, the following discrimination is usable. That is, the CPU 100 discriminates in the presence of a person in the neighborhood of the apparatus 1 in the case that the value of the counter satisfies the predetermined condition when the human presence sensor 400 detects the person in a predetermined range of time (1-2 sec, for example) including the instance of the discrimination of the step S101.

Figure 7:
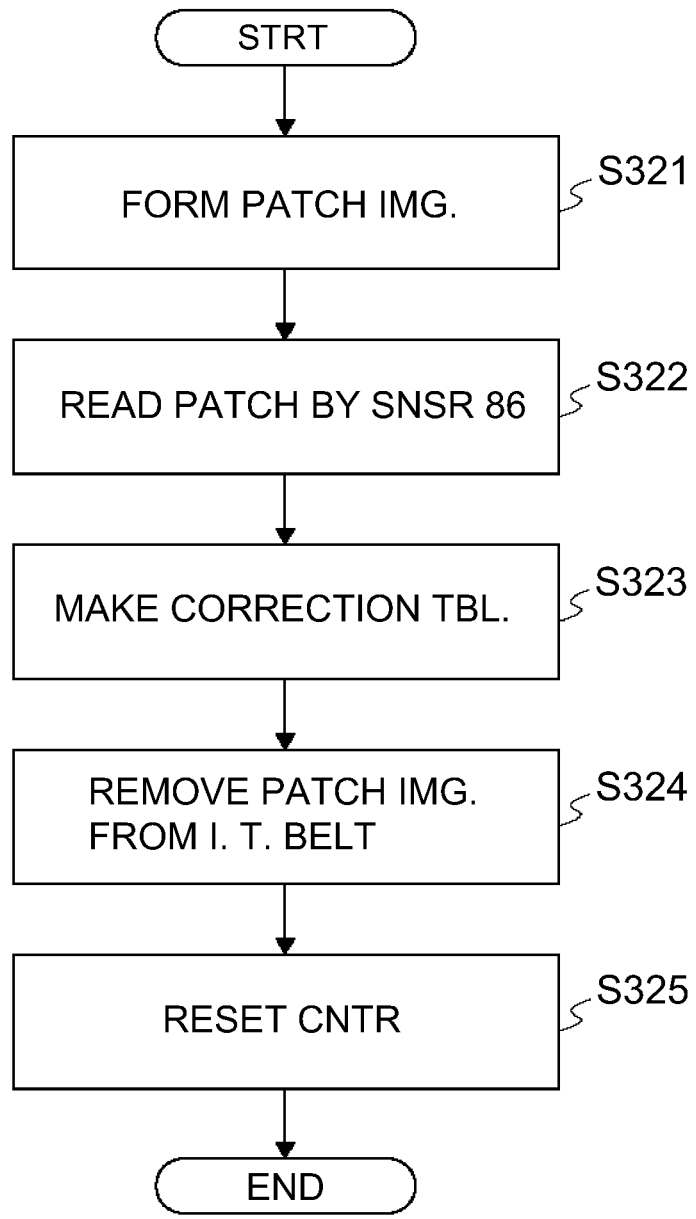
FIG. 7 is a flow chart showing of a sequence relating to a density adjustment control.

If there is no person in the neighborhood of the apparatus 1 as a result of the discrimination on the step S105, the CPU 100 interrupts the printing operation and executes the density adjustment control which will be described hereinafter (S106). By doing so, the density variation of the prints can be suppressed. With the execution of the density adjustment control, the count of the counter is reset (FIG. 7, S325). After executing the density adjustment control, the CPU proceeds to a step S104. In the case that the printing job is not yet completed, the CPU 100 returns to the step S101 to resume the printing operation.

On the other hand, if there is a person in the neighborhood of the apparatus 1 as a result of the detection of the human presence sensor 400 in this step S105, the CPU 100 proceeds to a step S107 to discriminate whether or not the count of the counter is not less than 1500. If the result of discrimination indicates that it is less than 1500, the CPU 100 continues the printing operation (S108, S109). The operations in the steps S108, S109 are similar to those of the steps S102, S103. That is, even if the predetermined condition is satisfied (S101, Yes), the printing operation is preferred to the density adjustment control when the human presence sensor 400 senses the presence of a person in the neighborhood of the apparatus 1.

On the other hand, if the count of the counter is not less than 1500 in the step S107, the CPU 100 interrupts the printing operation and executes density adjustment control which will be described hereinafter (S110). The CPU 100 forcefully executes the density adjustment control irrespective of the detection result of the human presence sensor 400. By doing so, the density changes to such a level that the quality of the print deteriorating remarkably can be prevented. With the execution of the density adjustment control, the integration counter is reset (FIG. 7, S325). After executing the density adjustment control, the CPU 100 proceeds to a step S104. In the case that the printing job is not yet completed, the CPU 100 returns to the step S101 to resume the printing operation.

According to the flow of the sequence, the following operation is performed.

(i) In the case that the count of the counter is not less than 1000 and less than 1500:

As long as the human presence sensor 400 senses the presence of human in the neighborhood of the apparatus 1, the CPU 100 repeats the operation of S101—Yes, S105—Yes, S107—No, S108, S109 and S104—No. That is, as long as the human presence sensor 400 senses the presence of a human in the neighborhood of the apparatus 1, the CPU 100 continues the printing operation without executing the density adjustment control operation. By thus delaying the execution of the adjustment process operation, the increase of the waiting time of the user waiting for the completion of the prints in the neighborhood of the apparatus 1 can be suppressed, and therefore, the desire of the user preferring the productivity can be satisfied.

On the other hand, if the human presence sensor 400 does not sense the presence of a human body (S105, No), the density adjustment control operation is carried out (S106). Therefore, the apparatus 1 can perform the density adjustment control operation with interruption of the printing operation in response to non-detection of the presence of the human body by the human presence sensor 400. This arises in the following cases, for example. The human presence sensor 400 continuously senses the presence of a human body in the neighborhood of the apparatus 1 in the duration of the counts of 1000-1100 of the counter, and human presence sensor 400 then does not sense the presence of the human body in the neighborhood of the apparatus 1 at the count of 111. By this, in the case that the user has already left the apparatus with the output prints, the CPU 100 can perform the density adjustment control without waiting for the condition of 1500 sheets. By doing so, the deterioration of the image quality can be suppressed.

As to the discrimination at the step S105 after the affirmative discrimination at the step S105 when the count of the counter is not less than 1000 and less than 1500, the negative discrimination may be made if the non-sensing by the human presence sensor 400 is continuous for a predetermined period. By this, it can be avoided that the density adjustment control operation is started when the person waiting for the completion of the outputs in the neighborhood of the apparatus 1 momentarily steps away from the detection range of the human presence sensor 400, in the state that the density adjustment control operation is delayed due to the presence of the person in the neighborhood of the apparatus 1.

(ii) In the case that the count of the counter has reached 1500:

The CPU 100 forcefully executes the density adjustment control irrespective of the detection result of the human presence sensor 400. By this, even if the execution of the density adjustment control is delayed preferring for the productivity, a remarkable density change attributable to the delaying the execution of the density adjustment control can be prevented.

<After Completion of Image Forming Process>

Figure 6:
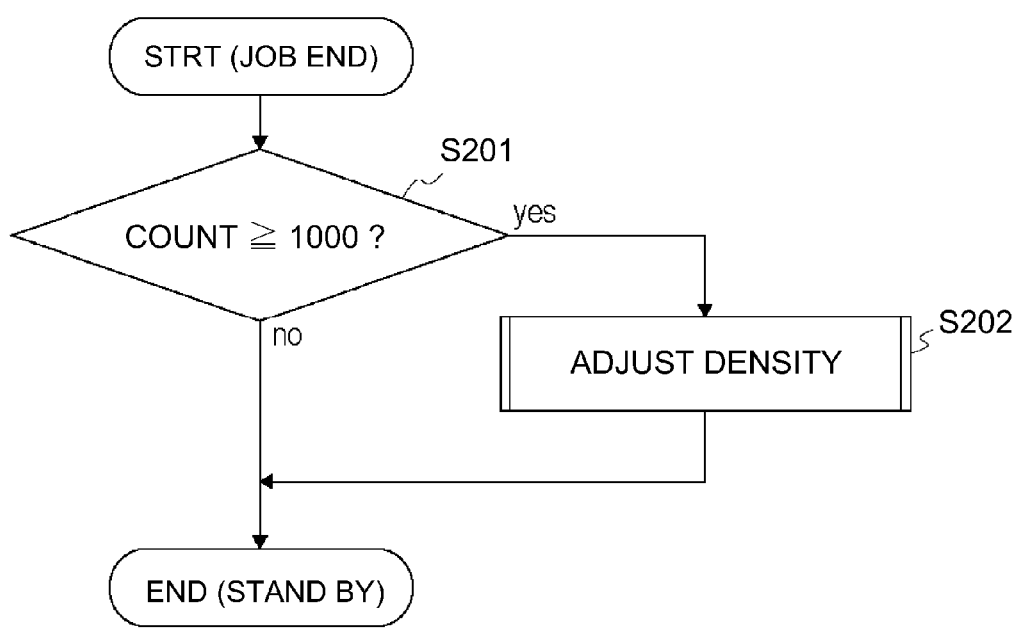
FIG. 6 is a flow chart showing a sequence immediately after completion of the image forming process operation.

FIG. 6 is a flow chart showing a sequence immediately after completion of the image forming process operation. If it is discriminated at the step S104 of FIG. 5 that the printing job is completed, the CPU 100 executes the flow of the sequential operations shown in FIG. 6 before proceeding to a stand-by mode.

The completion of the image forming process means the completion of the printing of the last sheet of the printing job (reserved job) received by the CPU 100. More particularly, in this embodiment, the completion of the image forming process operation is deemed at the time when the final sheet P of the reserved job is discharged onto the sheet discharge tray 21 (apparatus outside) by the pair of discharging rollers 20 as the discharging portion, and then the operation of FIG. 6 is started. The specific timing of the completion of the image forming process operation is not limited to these examples. More particularly, the timing may be any if it is between the instance at which the exposure device 4 of the upstreammost forming portion (unit UY, in this example) projects the beam for the trailing edge of the final image to be formed on the sheet P and the instance at which the sheet P is discharged out of the apparatus 1 (onto the sheet discharge tray 21, in this example). A predetermined instance between them is set as the completion of the image forming process operation beforehand.

The stand-by mode means the waiting state of the apparatus 1 waiting for the instruction of the next printing job (image formation instruction), in which the apparatus 1 is capable of starting the image forming operation in response to reception of the printing job.

Upon the completion of the printing job, the CPU 100 discriminates whether or not the count of the counter is not less than 1000 (whether or not the predetermined condition is satisfied) (S201). If the count is not less than 1000, the CPU 100 executes the density adjustment control operation (S202). Then, the operation proceeds to the stand-by mode.

By this, the delayed density adjustment control operation can be carried out before receiving the next printing job, in the case that the previous printing job is completed in the following state: despite the fact that the predetermined condition (not less than 1000 sheets) is met, the printing job is completed with the density adjustment control operation being delayed because of the detection of the human body in the neighborhood of the apparatus 1 by the human presence sensor 400. The apparatus 1 can perform the density adjustment control operation which has been deferred, utilizing the time waiting for the reception of the next printing job. As a result, the frequency of the interruption for the execution of the density adjustment control during the printing job operation instructed after the shifting to the stand-by mode can be reduced.

On the other hand, if the count of the counter is less than 1000, the CPU 100 shifts to the stand-by mode without carrying out the density adjustment control.

<Density Adjustment Control>

Referring to FIG. 7, the description will be made as to the density adjustment control of the steps S106 and S110 of FIG. 5 and thus the step S202 of FIG. 6. FIG. 7 is a flow chart showing of a sequence creating a density adjustment control.

In the density adjustment control of this embodiment, 40 patch images (10 patch images for each of yellow, magenta, cyan and black colors) are read by the density sensor 86. By this, a high precision tone gradation correction table can be determined, and therefore, a high precision feed-back can be supplied to the image forming portion. On the other hand, the numerousness of the patch images formed on the intermediary transfer belt 8 results in a long time of approx. 30 sec required for the execution of the density adjustment control, because the patch images can be removed from the intermediary transfer belt 8 by the intermediary transfer belt cleaning device (unshown).

When the density adjustment control is started, the CPU 100 controls the units UY, UM, UC and UK to form 10 tone gradation patch images on the intermediary transfer belt 8 (S321). Then, the CPU 100 reads the patch images using the density sensor 86 to determine the density (S322). The CPU 100 determines the tone gradation correction table to be used for the image formation, on the basis of the detection result of the density sensor 86 (S323). The CPU 100 operates the cleaning device (unshown) to remove the patch images from the intermediary transfer belt 8 (S324), after the completion of the reading of the density sensor 86. The CPU 100 resets the counter (S325) to complete the density adjustment control.

Embodiment 2

In Embodiment 1, the apparatus 1 defers (delays) the density adjustment control as an example.

In Embodiment 2, the deferred adjustment process is a rubbing treatment (refresh process) for adjusting the surface state of the fixing member.

The details of the apparatus of Embodiment 2 will be described particularly on the portions different from those of Embodiment 1. In the description of this embodiment, the same reference numerals as in Embodiment 1 are assigned to the elements having the corresponding functions in this embodiment, and the detailed description thereof is omitted for simplicity.

(5) Fixing Device

Figure 9:
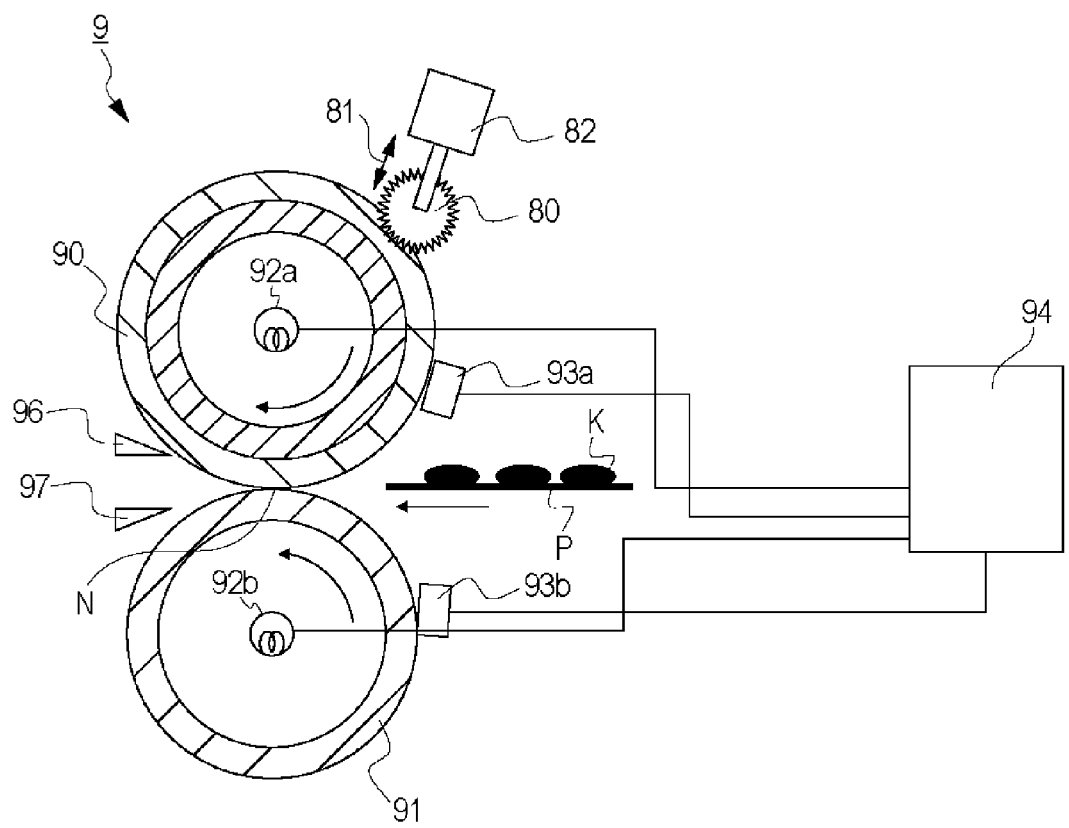
FIG. 9 illustrates a structure of a fixing device.

The fixing device (fixing portion) 9 of this embodiment will be described. FIG. 9 illustrates a structure of a fixing device. The fixing device 9 of the embodiment comprises a rubbing member (refreshing roller 80) for rubbing the fixing member to effect the refreshing operation as the adjustment process.

The fixing device 9 includes a fixing roller 90 containing therein halogen heaters 92*a*, 92*b*, a pressing roller 91 and separation claws 96 and 97 and so on. In this example, the fixing device 9 is a heating roller type device. More particularly, in the fixing device 9, the toner K electrostatically carried on the sheet P is fused and fixed on the sheet P fed into the fixing device 9. The fixing device 9 nips and feeds the sheet P by the press-contact portion (nip N) between the rotating fixing roller 90 and pressing roller 91.

The fixing roller 90 comprises a hollow core metal of the Al having an outer diameter of 50 mm and a thickness of 12 mm, an intermediary layer of Si rubber having a thickness of approx. 12 mm on the hollow core metal, and a surface coating layer of fluorinated resin material such as PTFE or the like having a thickness of approx. 20 μm on the Si rubber layer. The pressing roller 91 comprises a hollow core metal of Al having an outer diameter of 50 mm and a thickness of 12 mm, a silicone rubber layer having a thickness of 25 μm, and a top layer of PFA tube having a thickness of approx. 50 μm.

The fixing roller 90 and the pressing roller 91 can be pressed to each other and can be spaced from each other, and they are rotated by (unshown) driving motors. The halogen heaters 92*a*, 92*b* heat the inside surfaces of the fixing roller 90 and the pressing roller 91 with infrared radiations, respectively. Designated by reference numerals 93*a* and 93*b* are temperature detecting elements such as thermistors, thermo piles or the like. A temperature control device 94 controls the halogen heaters 92*a* and 92*b*. The temperature control device 94 receives the surface temperatures of the fixing roller 90 and the pressing roller 91 on the basis of the output signals of the temperature detecting elements 93*a* and 93*b*, and controls the heaters so that the surface of the fixing roller 90 maintains at 160 degree C. and the surface of the pressing roller 91 maintains at 100 degree C.

The refreshing roller 80 is a rubbing member for rubbing the fixing member. In this embodiment, the surface of the fixing roller (fixing member) 90 is rubbed. The refreshing roller 80 comprises a core metal of SUS having a diameter of 12 mm, a bonding layer thereon and abrasive grain as a rubbing material bonded by the bonding layer thereon, and is of a high density. The rubbing layer can be provided by bonding commercially available abrasive grain or a mixture of various abrasive grains by the bonding layer. Examples of commercially available abrasive grain includes aluminum oxide, aluminum hydroxide oxide, silicon oxide, cerium oxide, oxide titanium, zirconia, lithium silicate, silicon nitride, silicon carbide, iron oxide, oxide chromium, antimony oxide, diamond or the like particles. In this embodiment, alumina (aluminum oxide) particles (Alundum or Molundum particles) are used as the rubbing material. The alumina abrasive grain is most widely used, and the hardness thereof is sufficiently higher than that of the fixing roller 90, and the shapes have acute angles, and therefore, the machining property is so high that it is suitable as the rubbing material in this embodiment.

The refreshing roller 80 is movable in the direction indicated by an arrow 81. The refreshing roller 80 can be press-contacted into the fixing roller 90 with a predetermined intrusion and can be spaced therefrom, by the spacing means 82. When the refreshing roller 80 is press-contacted with the predetermined intrusion, a rubbing nip is provided between the refreshing roller 80 and the fixing roller 90. The refreshing roller 80 is driven by an unshown driving motor. The rotational direction of the refreshing roller 80 may be rotated codirectionally or counter-codirectionally with respect to the surface of the fixing roller 90, desirably with a surface speed difference between the surfaces of the refreshing roller and the fixing roller 90.

(6) Deferment of Refreshing Operation

In this example, the adjustment process to be deferred is the refreshing process for the fixing portion which is another example of the adjustment process. The refreshing process is the process of adjusting the surface state of the fixing member by rubbing the surface of the fixing member.

<Refreshing Process>

The apparatus 1 is capable of executing the refreshing process in order to reduce the difference of the unsmoothness of the surface of the fixing roller 90 in the longitudinal direction. With the increase of the processed sheets P by the fixing device, the surface of the fixing roller 90 is finely damaged (damage by edge) by being repeatedly contacted by the edge portions (the edges of the ends with respect to a direction perpendicular to the feeding direction of the sheets P, that is, the edges with respect to the longitudinal end portions of the fixing roller 90) of the sheets P. With the repetition of the fixing operation for the same size sheets with respect to the direction perpendicular to the feeding direction of the sheets P, the damage by edge is repeatedly imparted to the same position of the fixing roller 90 with respect to the longitudinal direction of the fixing roller 19. The surface state of fixing roller 90 at the repeatedly damaged portion is rougher than the other portions. When a sheet P having a size, with respect to the direction perpendicular to the feeding direction, larger than those having been repeatedly processed, the difference in the surface state (difference in the surface roughness) of the fixing roller 90 may appear on the fixed image as glossiness unevenness.

Therefore, the fixing roller 90 is subjected to the rubbing treatment by the refreshing roller 80 depending on the cumulative number of the prints. By the refreshing roller 80 contacting the fixing roller 90 with the peripheral speed difference, thin scrapes are provided on the entirety of the surface of the fixing roller 90 including the portions of the damage by edge. By this, the unevenness of the surface state is removed so that the glossiness unevenness can be suppressed.

<Execution Timing of Refreshing Process>

In the refreshing process, the refreshing roller 80 is rotated for 60 sec in contact with the fixing roller 90.

In order to provide the proper effect of the refreshing process, the apparatus 1 includes counter means for integrally counting the sheets P for each size with respect to the direction perpendicular to the feeding direction of the sheets after the previous execution of the refreshing process. The CPU 100 carries out the refreshing process in response to the integration counter. In this embodiment, the counter counts the small size sheet P (sheet smaller than A4 width, for example).

In this embodiment, the refreshing process operation is executed if the count of the counter is not less than 3000 (predetermined condition). By the execution of the refreshing process at the time of 3000 sheets of the count, the unevenness of the surface of the fixing roller 90 attributable to the edge damage is reduced to such an extent that the glossiness unevenness is remarkable by the user.

However, with the increase of the prints on the small size sheets P, the depth of the edge on the surface of the fixing roller 90 increases. If the depth of the damage is too deep, the unevenness of the surface state cannot be removed even by repeated operation of the rubbing treatment with the result of reduction of glossiness unevenness (vertical stripe or stripes) which is remarkable by the user. In the fixing device 9 of this embodiment, there is likelihood that the removal of the glossiness unevenness is difficult by the rubbing treatment if the count of the counter becomes not less than 6000. Therefore, the event of 6000 prints is selected as a second threshold, and when the count of the counter reaches 6000, the running image forming process operation is interrupted to execute the refreshing process operation. Therefore, the apparatus 1 executes adjustment process which was deferred when the predetermined condition is met (when the count was 3000), when an additional count reaches 3000.

When the count is not less than 3000 and less than 6000, it becomes difficult to sufficiently remove the non-uniformity in the surface state by one rubbing treatment with the increase of the prints, but the glossiness unevenness can be suppressed by the refreshing process operations to such a level that it is not remarkable by the user.

On one hand, if the predetermined condition (not less than 3000 of the count of the counter) is met, and if the human presence sensor 400 senses no presence of human, the image forming process is interrupted to execute the refreshing process. After 60 sec of the refreshing process, the CPU 100 resets the integration counter, and counts again the sheets P (small size) until the next execution of the refreshing process operation. On the other hand, if the predetermined condition (not less than 3000 of the count) is met, and if the human presence sensor 400 senses the presence of human, the CPU 100 defers the execution of the refreshing process and continues the image forming process operation. However, after the deferment of the refreshing process, the apparatus 1 interrupts the image forming process operation and executes the refreshing process operation if the count reaches 6000, irrespective of whether or not the human presence sensor 400 senses the presence of human in the neighborhood of the apparatus 1. Thus, even if the adjustment process is deferred, the deterioration of the image quality can be suppressed. When the refreshing process is executed, the CPU 100 resets the integration counter, and counts again the sheet P (small size) until the next execution of the refreshing process.

The value of the count in this example (3000 and/or 6000) is an example, and the present invention is not limited to this example.

<Control with Execution of Image Forming Process>

FIG. 5 is a flow chart showing a sequence of an image forming process operation. The flow of the sequence is similar to that of Embodiment 1 (FIG. 5) except for the specific threshold values of the counts, the counting method and the specific adjustment process (refreshing process), and therefore, the detailed description is omitted.

When the printing job operation starts, the CPU 100 discriminates whether or not the count of the integration counter reaches 3000 (that is, whether the predetermined condition is satisfied or not) (S501). If the count is less than 3000, the CPU 100 carries out the printing on the next sheet P (S502). In the case that the size of the printed sheet P is not more than A4 width (small size), the counter is incremented by one (S503, Yes; S504), and in the case that the size of the printed sheet P exceeds A4 width, the counter is not incremented (S503, No; S505). The size of the sheet P is discriminated on the basis of the information included in the printing job set on the operating portion 200.

Then, the CPU 100 discriminates whether or not the printing job is completed (S506). If the result of the discrimination indicates that the printing job has not yet been completed, the operation returns to the step S501.

If the result of discrimination in the step S501 indicates that the count is not less than 3000, the CPU 100 discriminates whether or not the human presence sensor 400 senses a human body in the predetermined area in the neighborhood of the apparatus 1 (S507), similarly to the step S105 of FIG. 5. When sensor 400 does not sense a human body in the predetermined area in the neighborhood of the apparatus 1, the refreshing process which will be described hereinafter is carried out (S508). Then, the CPU 100 proceeds to a step S506 after the execution of the refreshing process operation. In the case that the printing job is not yet completed, the CPU 100 returns to the step S501 to resume the printing operation.

On the other hand, if the human presence sensor 400 detects the presence of a human body in the neighborhood of the apparatus 1 at step S507, the CPU 100 proceeds to a step S509 in which the discrimination is made as to whether or not the count of the counter is not less than 6000. If the account is less than 6000, the CPU 100 continues the printing operation (S510-S513). The steps S510-S513 are substantially the same as the steps S502-S505.

On the other hand, if the discrimination in the step S509 indicates that the count is not less than 6000, the CPU 100 interrupts the printing operation to carry out the refreshing process which will be described hereinafter (S514). Here, the CPU 100 forcefully executes the refreshing process irrespective of the detection result of the human presence sensor 400. This can prevent the reduction of the glossiness unevenness from becoming difficult, so that the deterioration of the image quality attributable to the production of the glossiness unevenness can be suppressed. By the execution of the refreshing process, the count of the counter is reset.

Then, the CPU 100 proceeds to a step S506 after the execution of the refreshing process operation. In the case that the printing job is not yet completed, the CPU 100 returns to the step S501 to resume the printing operation.

According to the flow of the sequence, the following operation is performed.

(i) In the case that the count of the counter is not less than 3000 and less than 6000:

As long as the human presence sensor 400 senses a human body in the neighborhood of the apparatus 1, the CPU 100 continues the printing operation without executing the refreshing process. By deferring the adjustment process in this manner, the increase of the waiting time of the user waiting for the output of the prints in the neighborhood of the apparatus 1 is not increased.

On the other hand, if the human presence sensor 400 does not sense a human body in the neighborhood of the apparatus 1 (S507, No), the refreshing process is carried out (S508). Therefore, in response to the change to the absence of the human body by the human presence sensor 400, the printing operation is interrupted, and the refreshing operation can be executed. In the case that the person in the neighborhood of the apparatus 1 has left the apparatus 1 after taking the output prints, the CPU 100 can execute the refreshing process without waiting for the condition not less than 6000. By doing so, the deterioration of the image quality can be suppressed.

(ii) When the count reaches 6000:

Here, the CPU 100 forcefully executes the refreshing process irrespective of the detection result of the human presence sensor 400. By this, the remarkable deterioration of the image quality and/or production of the damage by edge can be prevented even when the refreshing process is deferred in preference for the productivity.

<After Completion of Image Forming Process>

FIG. 6 is a flow chart showing a sequence immediately after completion of the image forming process operation.

Figure 10:
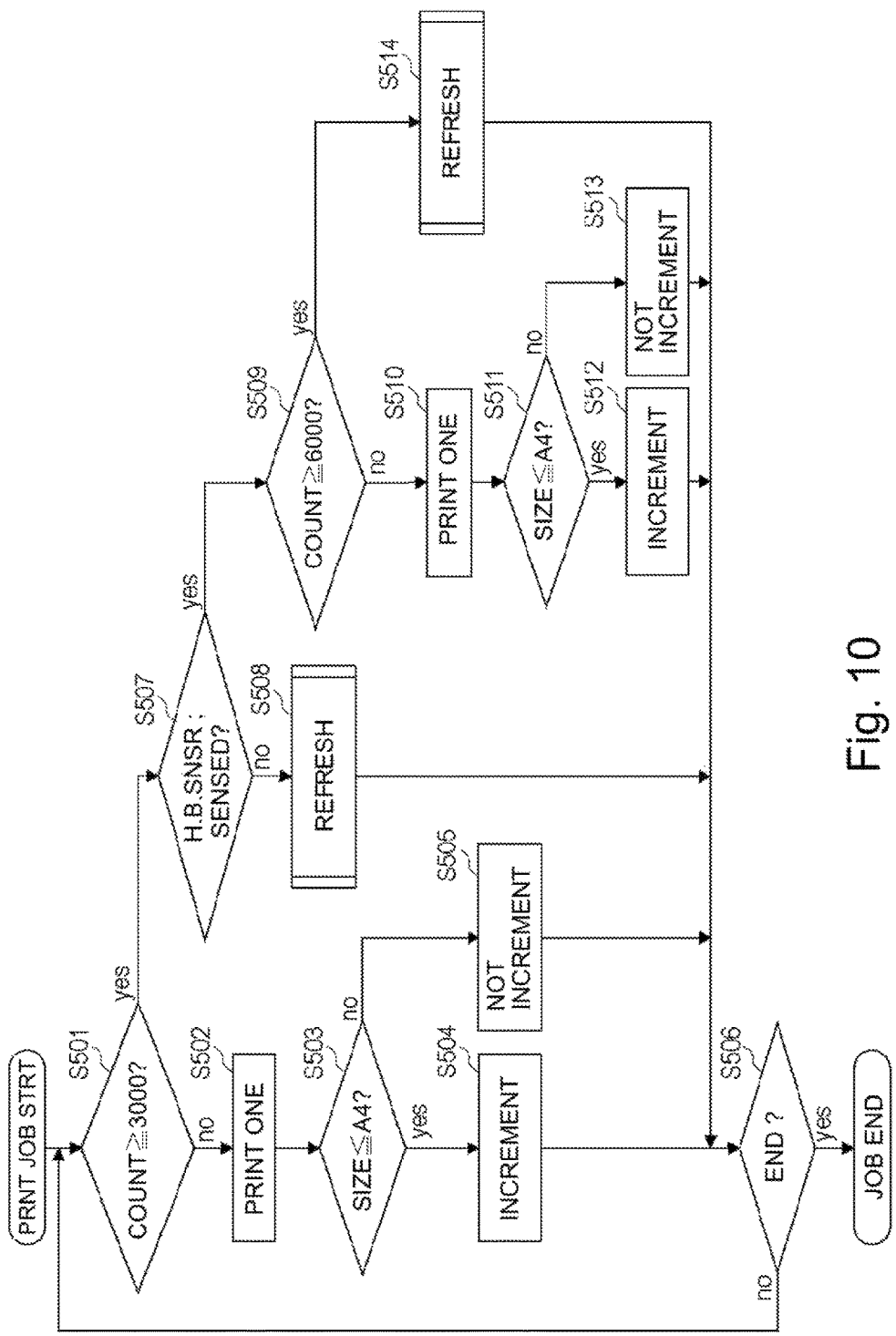
FIG. 10 is a flow chart showing a sequence of an image forming process operation.

When the printing job is completed at the step S506 in FIG. 10, the CPU 100 discriminates whether or not the count of the counter is not less than 3000 (whether or not the predetermined condition is met) (S601). When the count it not less than 3000, the CPU 100 executes the refreshing process operation (S602). Then, the operation proceeds to the stand-by mode.

By this, the deferred refreshing process can be carried out before the next job is received, in the case that the printing job is completed as follows. That is the case that the printing job is completed with the refreshing process deferred due to the detection of the human body by the human presence sensor 400 in the neighborhood of the apparatus 1, despite the fact that the predetermined condition is satisfied. Utilizing the time waiting for the reception of the printing job, the deferred refreshing process can be carried out. As a result, the frequency of the refreshing process operations interrupting the printing job operation received after the shifting to the stand-by mode can be minimized.

On the other hand, when the count of the counter is less than 3000, the CPU 100 shifts to the stand-by mode without executing the refreshing process.

<Refreshing Process>

Figure 11:
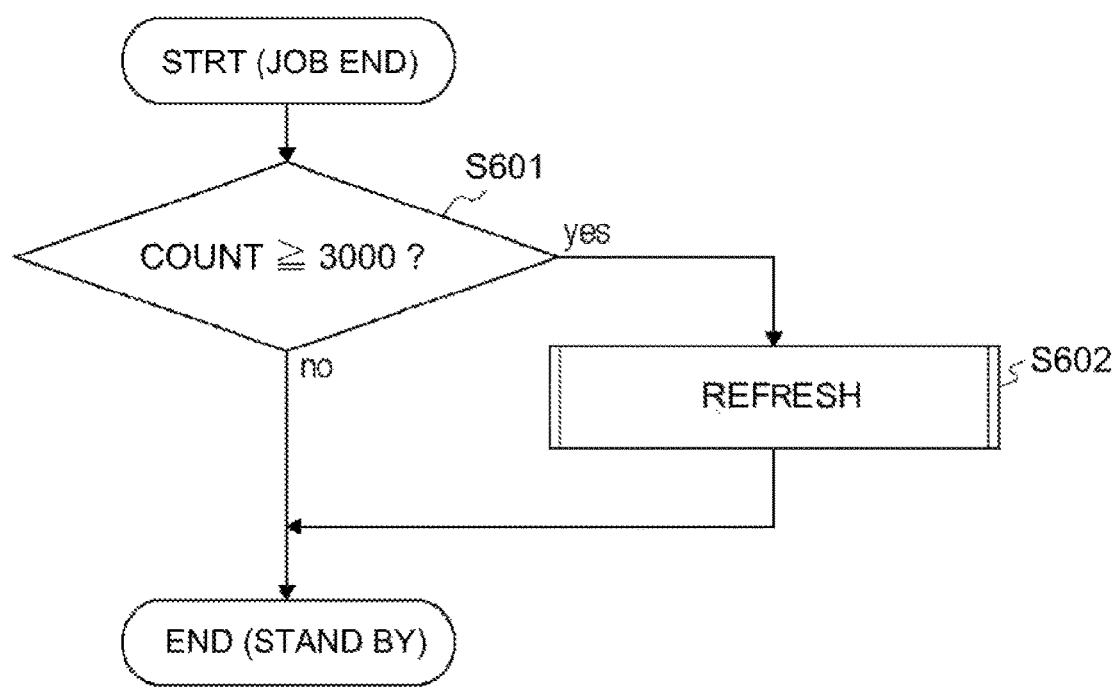
FIG. 11 is a flow chart showing a sequence immediately after completion of the image forming process operation.
Figure 12:
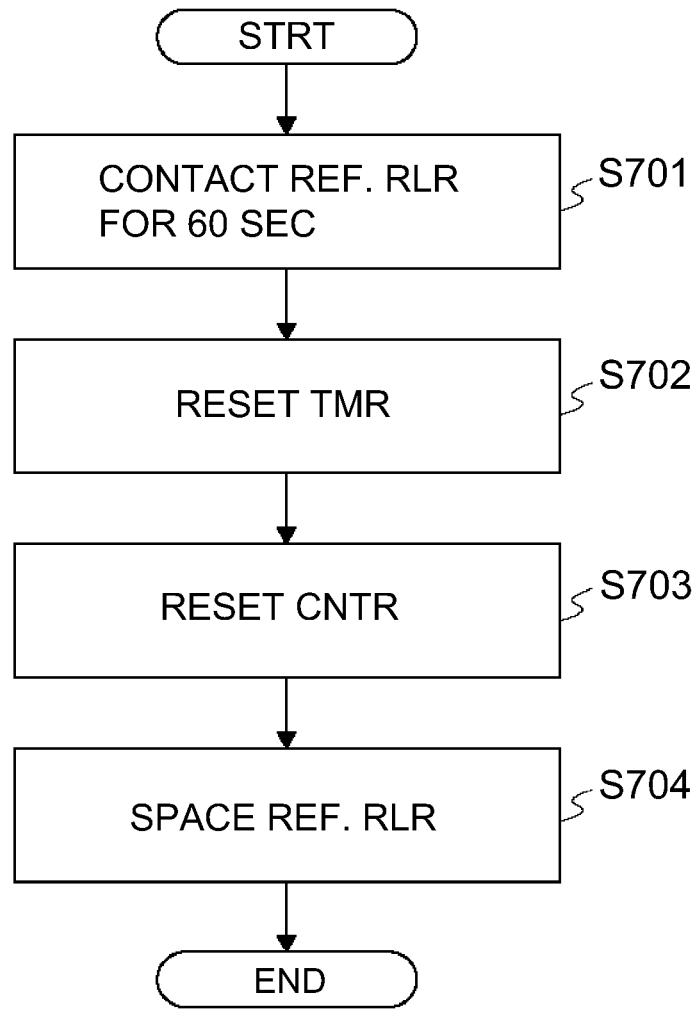
FIG. 12 is a flow chart showing a sequence relating to a refreshing process operation.

Referring to FIG. 12, the description will be made as to the control for the refreshing process executed in steps S508 and S514 of FIG. 10 and a step S602 of FIG. 11. FIG. 12 is a flow chart showing of a sequence relating to a refreshing process operation.

When the refreshing process is started, the CPU 100 effects rotation of the refreshing roller 80 in contact with the fixing roller 90 for 60 sec (S701). The rubbing time (60 sec) is counted on the RAM 500 by the CPU 100 functioning as an integration timer. When the rubbing treatment for 60 sec is completed, the CPU 100 resets the timer (S702), and resets the count of the counter for counting the small size sheet prints (S703). Then, the CPU 100 spaces the refreshing roller 80 from the fixing roller 90 (S704) and finishes the refreshing process.

In this example, the rubbing time in the refreshing process is 60 sec, but this is merely an example, and the present invention is not limited to this example. For example, the rubbing time may be changed in accordance with the count of the integration counter. In addition, in the refreshing process forcefully interrupting the image forming process operation in the step S514, the rubbing time may be made longer than the refreshing process operation period in the step S508, in consideration of the fact that the cumulative number of prints is larger than the predetermined number (3000 in this example).

<The Other Structures>

Figure 13:
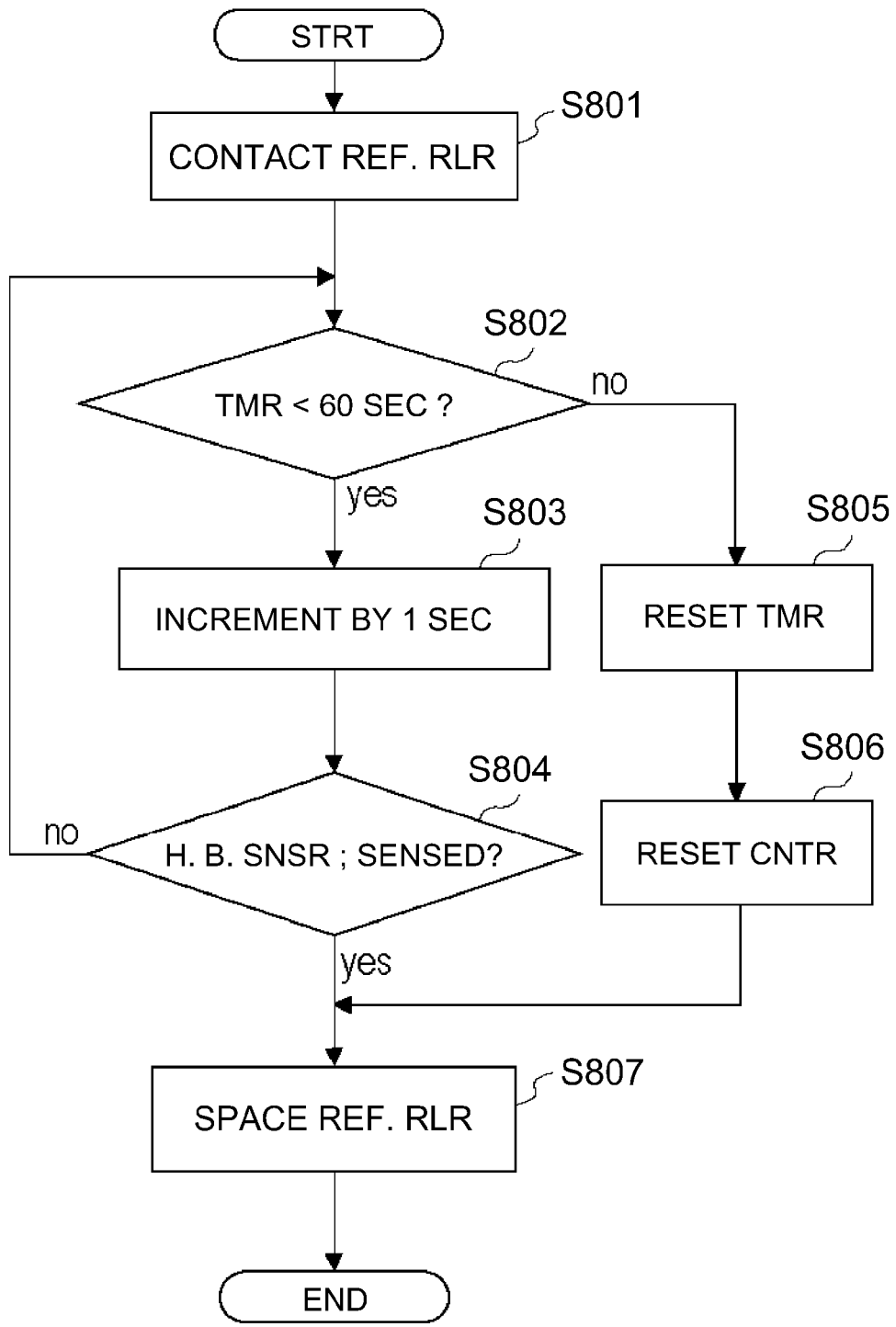
FIG. 13 is a flow chart showing a sequence relating to a refreshing process operation.

Alternatively, the refreshing process executed in the step S508 of FIG. 10 may be as shown in FIG. 13, and in the case that the human body is detected in the neighborhood of the apparatus 1 by the human presence sensor 400 during the rubbing treatment, the rubbing treatment is stopped partway. FIG. 13 is a flow chart showing of a sequence relating to a refreshing process operation.

When the refreshing process is started, the CPU 100 contacts the refreshing roller 80 to the fixing roller 90 and rotates the refreshing roller 80 (S801). The rubbing time is counted on the RAM 500 by the CPU 100 functioning as the integration timer until 60 sec is reached.

The CPU 100 discriminates whether or not the time period is less than 60 sec (S802). If it is less than 60 sec, the CPU 100 increments the timer by 1 sec, and continues the rubbing treatment for 1 sec (S803). Then, it is discriminated as to whether or not the human presence sensor 400 detects a human body in the neighborhood of the apparatus 1. If the human presence sensor 400 does not detect the human body in the neighborhood of the apparatus 1, the operation returns to the step S802 to continue the rubbing treatment. Until the timer reaches 60 sec, the rubbing operation is continued, and when the timer reaches 60 second (No, S802), the timer is reset (S805), and the counter is reset (S806). The refreshing roller 80 is spaced from the fixing roller 90 (S807) to finish the refreshing process.

On the other hand, when the human presence sensor 400 detects the human body in the neighborhood of the apparatus 1 in the period of 1-59 sec of the timer (S804, Yes), the refreshing roller 80 is spaced from the fixing roller (S807), and the rubbing treatment is stopped partway. By doing so, when the user waiting for the output prints during the refreshing process approaches to the apparatus 1, the refreshing process is interrupted to resume the printing operation, and therefore, the desire of the user preferring for the productivity can be met. At this time, the timer and the counter are not reset.

Because they are not reset, the interrupted refreshing process can be performed with the delay in accordance with the flow of the sequence shown in FIG. 10. Thus, even when the refreshing process is interrupted, the refreshing process can be supplementally performed, and therefore, the deterioration of the image quality can be prevented. The timing of executing the supplemental refreshing process is the time when the count of the counter reaches 6000 (S514) after the interruption of the refreshing process (S804, Yes) and the subsequent printing job, for example. Or, for example, it is the time when the human presence sensor 400 becomes not sensing the human body in the neighborhood of the apparatus 1 (S508) prior to the count of the counter reaching 6000, or when the printing job is completed (S602) prior to the count of the counter reaching 6000.

By not resetting the timer, the interrupted rubbing treating operation can be performed so as to continue from the state of the interruption when the refreshing process operation is carried out again in the step S508. By doing so, the prolongation of the refreshing process duration can be prevented. When the refreshing process operation is carried out again at the step S508, the interruption of the rubbing treatment may be prevented even when the human presence sensor 400 detects the human body in the rubbing treatment. By this, the repetition of the interruption (S804, Yes) of the rubbing treatment in FIG. 13 and the interruption (S507, No) of the image forming process by the rubbing treatment can be avoided. More particularly, when the refreshing process operation is carried out in the step S508, the refreshing process is carried out in accordance with the flow shown in FIG. 14.

<Other Structures>

Figure 14:
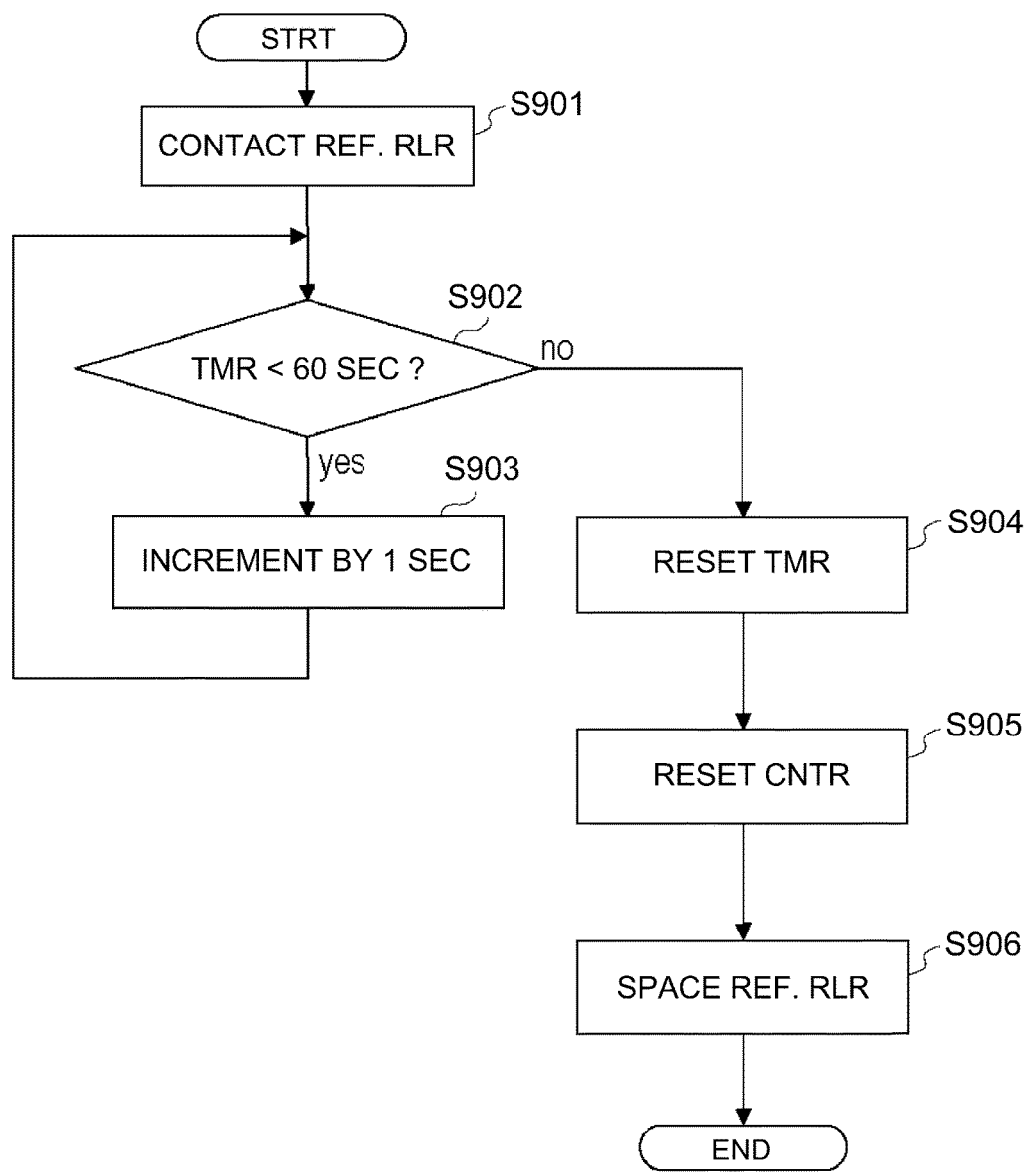
FIG. 14 is a flow chart showing a sequence relating to a refreshing process operation.

In addition to the control of FIG. 13 for the refreshing process executed in the step S508 of FIG. 10, the refreshing process executed in the step S602 of FIG. 11 is controlled by the flow shown in FIG. 14. When the rubbing treatment of S508 is interrupted, and the printing job is completed prior to the count of the counter reaching 6000, the rubbing treatment can be carried out for the rest of the rubbing treatment process operation. By doing so, the prolongation of the refreshing process time in this step S602 can be prevented.

FIG. 14 is a flow chart showing a sequence relating to a refreshing process operation. When the refreshing process is started, the CPU 100 contacts the refreshing roller 80 to the fixing roller 90 and rotates the refreshing roller 80 (S901). The rubbing time is counted on the RAM 500 by the CPU 100 functioning as the integration timer until 60 sec is reached.

The CPU 100 discriminates whether or not the time period is less than 60 sec (S802). If it is less than 60 sec, the CPU 100 increments the timer by 1 sec, and continues the rubbing treatment for 1 sec (S903). When the timer reaches 60 sec (S902, No), the timer is reset (S904), and the counter is also reset (S905). Then, the refreshing roller 80 is spaced from the fixing roller 90 to finish the refreshing process (supplementation).

(7) Control Block Diagram

Figure 15:
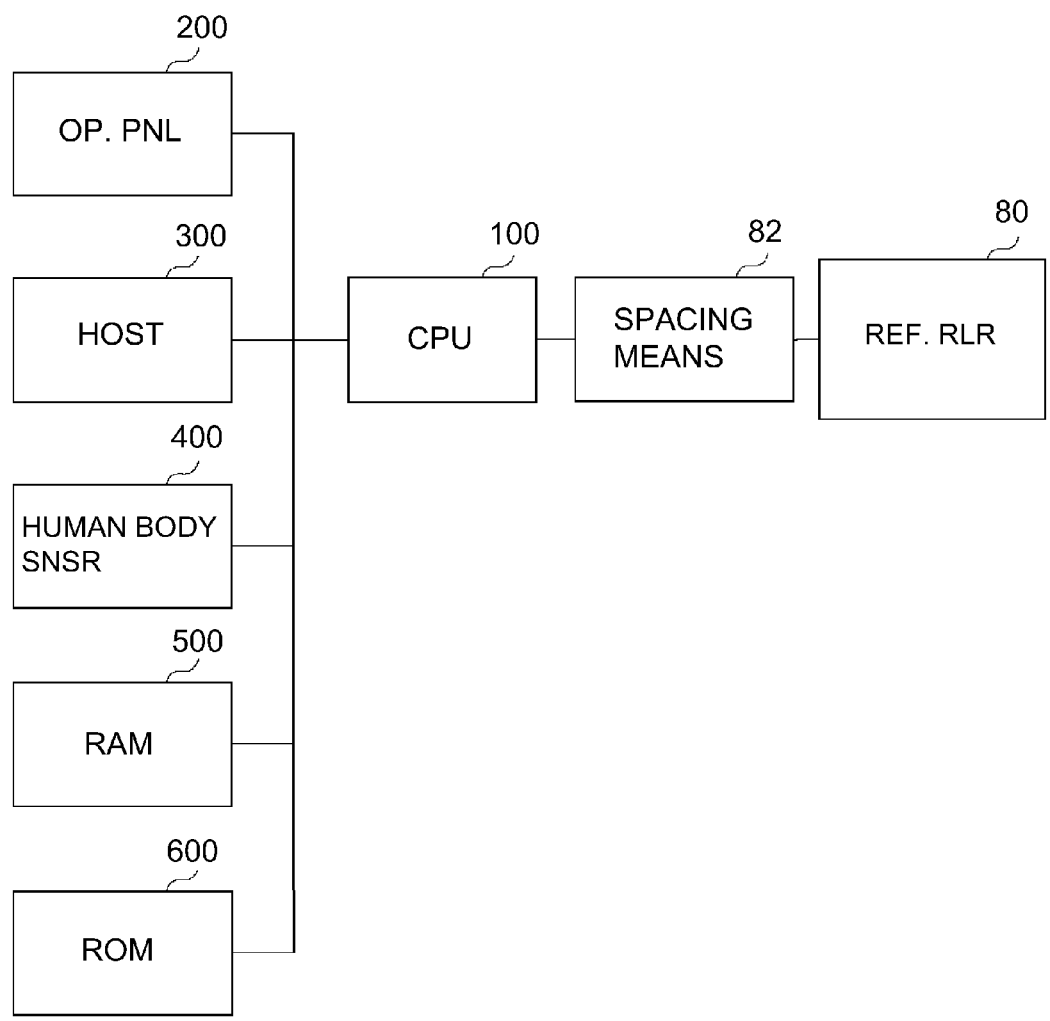
FIG. 15 is a control block diagram.

FIG. 15 is a control block diagram, and shows an example of hardware structures including the CPU 100, according to this embodiment. The CPU 100 is electrically connected with the operating portion 200, the host apparatus 300, the human presence sensor 400, RAM 500, ROM 600 and the spacing means 82. The CPU 100 is electrically connected with the refreshing roller 80 through the spacing means 82. The CPU 100 as the executing portion executes the program stored in the RAM 500 to control various elements electrically connected. The program may be stored in the ROM 600.

Embodiment 3

The adjustment process to be deferred is not limited to the density adjustment control described in Embodiment 1 or the refreshing process described in Embodiment 2. For example, it may be a voltage adjustment for the transfer portion or an adjustment for the charged potential of the drum 2 by the charge portion. Furthermore, it may be an adjustment of toner supply amount into the developing container of the developing portion. Moreover, it may be a positional adjustment for correcting misalignment of the toner images between different color images, or an adjusting operation for the cleaning, or another adjusting operation for the image forming portion and/or the fixing portion of the image forming apparatus.

Embodiment 4

In the foregoing description, the predetermined condition for executing the adjustment process operation has been described as being the count of the integration counter which is incremented by the prints, but the predetermined condition is not limited to such an example. For example, the predetermined condition may be elapse of a predetermined time period (10 minutes, for example) from reference timing. More particularly, it may be based on the total time period executing the image forming process from the previous adjustment process operation.

In the foregoing description, the second condition is based on the number of prints continued after the deferment of the adjustment process operation, but the second condition is not limited to this example. For example, the image forming process may be interrupted by the adjustment process in response to an elapse of a predetermined time period (5 minutes, for example) of the image forming process operation continued with the adjustment process deferred after the predetermined condition is met.

In addition, another trigger may be provided to execute the adjustment process. For example, when the temperature and/or the humidity around the apparatus 1 changes by a predetermined amount, the adjustment process may be executed even if the predetermined condition is not satisfied.

Embodiment 5

In the foregoing description, when the predetermined condition it satisfied, and the human presence sensor 400 detects a human body in the neighborhood of the apparatus 1, the image forming process is continued with the deferment of the adjustment process in preference for the productivity. In this embodiment, this is called a printing priority mode.

In this embodiment, the user is capable of selecting whether or not the printing priority mode is executed. In the following description, the adjustment process is that of Embodiment 1 as an example.

When the printing priority mode is selected, the control is the same as in Embodiment 1.

On the other hand, when the printing priority mode is not selected, the adjustment process is not deferred, when the predetermined condition is satisfied, and the human presence sensor 400 detects the human body in the neighborhood of the apparatus 1. More particularly, irrespective of the result of discrimination in the step S105 of FIG. 5 (Embodiment 1), that is, irrespective of whether or not the human presence sensor 400 detects the human body, the adjustment process of the S106 of FIG. 5 is carried out (adjustment priority mode).

The selection of the mode from the printing priority mode and the adjustment priority mode can be made on the operating portion 200 functioning as a selector. The operator selects one of the modes from the printing priority mode and the adjustment priority mode by setting on the operating portion 200. The CPU 100 executes the mode selected on the operating portion 200 and functions as an executing portion capable of selectively executing one of the printing priority mode and the adjustment priority mode.

In this embodiment, the structures by which the mode to be executed by the CPU 100 can be selected is used with Embodiment 1, but may be used with any one of the other the embodiments.

The structure described in [Others] in Embodiment 2 may be modified such that the user can select from two modes regarding the refreshing process to be executed in the step S508. More particularly, in one of the modes, the refreshing process shown in FIG. 13 is carried out, and when the human presence sensor 400 detects the human body during the refreshing process, the refreshing operation is interrupted to resume with the image forming operation (printing priority mode). In the second mode, the refreshing process shown in FIG. 14 is carried out, and irrespective of the results of the detection of the human presence sensor 400, the refreshing process operation is carried out on the basis of the integration timer (adjustment priority mode).

Thus, the user can select one of the printing priority mode in which the waiting time is reduced when the printing job is continued with the deferment of the adjustment process and the adjustment priority mode in which the adjustment process is carried out to maintain the image quality of the prints. Therefore, the apparatus 1 is suitable for the user preferring for the stability of the image quality of the prints, as well. The control responsive to the user's preference can be performed, thus improving the usability.

[Other Structures]

In the foregoing description, the image forming apparatus 1 is a color image forming apparatus comprising four image forming portions for forming yellow, magenta, cyan and black toner images, respectively, but the present invention is applicable to a monochromatic image forming apparatus. For example, the present invention is applicable to a black monochromatic image forming apparatus.

In addition, in the foregoing description, the image forming apparatus 1 is an intermediary transfer type apparatus comprising an intermediary transfer belt 8 as an intermediary transfer member, but the present invention is applicable to a direct transfer type apparatus in which the toner image is directly transferred from the forming portion onto the sheet P. In such a case, a transfer roller is provided at a position (inside the belt) opposed to the image forming portion with the transfer feeding belt interposed therebetween, the transfer feeding belt carrying the sheet P electrostatically attracted thereon. The transfer roller functions to transfer the toner image formed on the image bearing member, and to the sheet P carried on the transfer feeding belt. By this, the toner image (unfixed) is formed on the sheet P.

While the present invention has been described with reference to exemplary embodiments, it is to be understood that the invention is not limited to the disclosed exemplary embodiments. The scope of the following claims is to be accorded to broadset interpretation so as to encompass all such modifications and equivalent structures and functions.

This application claims the benefit of Japanese Patent Application No. 2015-236803 filed on Dec. 3, 2015, which is hereby incorporated by reference herein in its entirety.

What is claimed is:

1. An image forming apparatus comprising:
an image forming portion configured to form images on recording materials;
a human presence sensor configured to detect presence of a human body in a predetermined area; and
a controller configured to control as to whether to execute an adjustment process operation for said image forming portion, depending on whether or not said human presence sensor detects the human body,
wherein
when a number of recording materials on which the images are formed by said image forming portion during execution of an image forming process operation is a first predetermined number, and said human presence sensor does not detect the human body, said controller interrupts the image forming process operation and executes the adjustment process operation, and
when the number of recording materials on which the images are formed by said image forming portion during the execution of the image forming process operation is the first predetermined number, and said human presence sensor detects the human body,
said controller defers the execution of the adjustment process operation and continues the image forming process operation, and said controller interrupts the continued image forming process operation and executes the adjustment process operation when a number of recording materials on which the images are formed by said image forming portion during the continued image forming process operation reaches a second predetermined number.

2. An apparatus according to claim 1, wherein when the number of recording materials on which the images are formed by said image forming portion during the execution of image forming process operation reaches the first predetermined number, and then a number of recording materials reaches the second predetermined number during the image forming process operation continued without execution of the adjustment process operation, said controller interrupts the image forming process operation and executes the adjustment process operation irrespective of whether or not said human presence sensor detects the human body.

3. An apparatus according to claim 1, wherein when the number of recording materials on which the images are formed by said image forming portion during the execution of image forming process operation reaches the first predetermined number, and then said human presence sensor becomes a state of not detecting the human body before the second predetermined number is reached, said controller interrupts the image forming process operation in response to said human presence sensor becoming the state of not detecting the human body.

4. An apparatus according to claim 1, wherein when the number of recording materials on which the images are formed by said image forming portion during the execution of image forming process operation reaches the first predetermined number, and then the image forming process operation is completed with the execution of the adjustment process operation being deferred before the second predetermined number is reached, said controller executes the adjustment process operation before executing stand-by mode in which said apparatus waits for a next image formation instruction in a condition capable of starting the image forming process operation.

5. An apparatus according to claim 1, wherein said image forming portion includes a photosensitive member, a toner image forming portion configured to form a toner image on said photosensitive member, and wherein the adjustment process operation executed by said controller includes forming a pattern image for determining an image forming condition on said photosensitive member by said forming portion.

6. An apparatus according to claim 1, further comprising a receiving portion for receiving an image formation instruction, wherein said controller activates said receiving portion in response to detection of the human body by said human presence sensor in a state that electric power supply to said receiving portion is shut off.

7. An image forming apparatus comprising:
an image forming portion configured to form images on recording materials;
a fixing portion configured to fix the image formed by said image forming portion on the recording material;
a human presence sensor configured to detect presence of a human body in a predetermined area; and
a controller configured to control as to whether to execute an adjustment process operation for said fixing portion, depending on whether or not said human presence sensor detects the human body,
wherein
when a number of recording materials on which the images are formed by said image forming portion during execution of an image forming process operation is a first predetermined number, and said human presence sensor does not detect the human body, said controller interrupts the image forming process operation and executes the adjustment process operation, and
when the number of recording materials on which the images are formed by said image forming portion during the execution of the image forming process operation is the first predetermined number, and said human presence sensor detects the human body, said controller defers the execution of the adjustment process operation to continue the image forming process operation, and said controller interrupts the continued image forming process operation and executes the adjustment process operation when a number of recording materials on which the images are formed by said image forming portion during the continued image forming process operation reaches a second predetermined number.

8. An apparatus according to claim 7, wherein when the number of recording materials on which the images are formed by said image forming portion during the execution of image forming process operation reaches the first predetermined number, and then a number of recording materials reaches the second predetermined number during the image forming process operation continued without execution of the adjustment process operation, said controller interrupts the image forming process operation and executes the adjustment process operation irrespective of whether or not said human presence sensor detects the human body.

9. An apparatus according to claim 7, wherein when the number of recording materials on which the images are formed by said image forming portion during the execution of image forming process operation reaches the first predetermined number, and then said human presence sensor becomes a state of not detecting the human body before the second predetermined number is reached, said controller interrupts the image forming process operation in response to said human presence sensor becoming the state of not detecting the human body.

10. An apparatus according to claim 7, wherein when the number of recording materials on which the images are formed by said image forming portion during the execution of image forming process operation reaches the first predetermined number, and then the image forming process operation is completed with the execution of the adjustment process being deferred before the second predetermined number is reached, said controller executes the adjustment process before executing a stand-by mode in which said apparatus waits for a next image formation instruction in a condition capable of starting the image forming process.

11. An apparatus according to claim 7, wherein when the number of recording materials on which the images are formed by said image forming portion during the execution of the image forming process operation reaches the first predetermined number, and said human presence sensor does not detect the human body, said controller interrupts the image forming process operation and executes the adjustment process operation, and said controller interrupts the adjustment process operation and resumes the image forming process operation when said human presence sensor detects the human body during the execution of the adjustment process operation.

12. An apparatus according to claim 7, further comprising a receiving portion for receiving an image formation instruction, wherein said controller activates said receiving portion in response to detection of the human body by said human presence sensor in a state that electric power supply to said receiving portion is shut off.

13. An image forming apparatus comprising:
an image forming portion configured to form images on recording materials;
a human presence sensor configured to detect presence of a human body in a predetermined area; and
a controller configured to control as to whether to execute an adjustment process operation for said image forming portion, depending on whether or not said human presence sensor detects the human body,
wherein
when a time period of execution of an image forming process operation is a first predetermined period, and said human presence sensor does not detect the human body, said controller interrupts the image forming process operation and executes the adjustment process operation, and
when the time period of execution of the image forming process operation is the first predetermined period, and said human presence sensor detects the human body, said controller defers the execution of the adjustment process operation and continues the image forming process operation, and said controller interrupts the continued image forming process operation and executes the adjustment process operation when a time period of execution of the continued image forming process operation reaches a second predetermined period.

14. An image forming apparatus comprising:
an image forming portion configured to form images on recording materials;
a human presence sensor configured to detect presence of a human body in a predetermined area;
a selector configured to receive a selection of one of a plurality of modes including a first mode and a second mode; and
a controller configured to execute an operation in the mode selected by said selector,
wherein in the case that the first mode is selected by said selector,
when a number of recording materials on which the images are formed by said image forming portion during execution of an image forming process operation is a first predetermined number, and said human presence sensor does not detect the human body, said controller interrupts the image forming process operation and executes an adjustment process operation for said image forming portion, and
when the number of recording materials on which the images are formed by said image forming portion during the execution of the image forming process operation is the first predetermined number, and said human presence sensor detects the human body, said controller defers the execution of the adjustment process operation and continues the image forming process operation, and said controller interrupts the continued image forming process operation and executes the adjustment process operation when a number of recording materials on which the images are formed by said image forming portion during the continued image forming process operation reaches a second predetermined number, and
wherein in the case that the second mode is selected by said selector,
when the number of recording materials on which the images are formed during execution of the image forming process operation is the first predetermined number, said controller interrupts the image forming process operation and executes the adjustment process without deferring the execution of the adjustment process operation.

15. A control device for controlling an image forming apparatus, said image forming apparatus including an image forming portion configured to form images on recording materials, and a human presence sensor configured to detect presence of a human body in a predetermined area, said control device comprising:
a controller configured to control as to whether to execute an adjustment process operation for the image forming portion, depending on whether or not the human presence sensor detects the human body,
wherein
when a number of recording materials on which the images are formed by the image forming portion during execution of an image forming process operation is a first predetermined number, and the human presence sensor does not detect the human body, said controller interrupts the image forming process operation and executes the adjustment process operation, and
when the number of recording materials on which the images are formed by the image forming portion during the execution of the image forming process operation is the first predetermined number, and the human presence sensor detects the human body,
said controller defers the execution of the adjustment process operation and continues the image forming process operation, and said controller interrupts the continued image forming process operation and executes the adjustment process operation when a number of recording materials on which the images are formed by the image forming portion during the continued image forming process operation reaches a second predetermined number.

* * * * *